(12) United States Patent
Kudo

(10) Patent No.: US 7,406,998 B2
(45) Date of Patent: Aug. 5, 2008

(54) HEAT STORING DEVICE

(75) Inventor: Tomohide Kudo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 183 days.

(21) Appl. No.: 11/357,477

(22) Filed: Feb. 17, 2006

(65) Prior Publication Data

US 2006/0196632 A1 Sep. 7, 2006

(30) Foreign Application Priority Data

Feb. 17, 2005 (JP) ............................ 2005-041105
Feb. 18, 2005 (JP) ............................ 2005-042293

(51) Int. Cl.
*F28D 17/04* (2006.01)
*F28F 3/04* (2006.01)

(52) U.S. Cl. ........................ 165/10; 165/166; 165/902

(58) Field of Classification Search .................. 165/10, 165/902, 165, 166, 170
See application file for complete search history.

(56) References Cited

U.S. PATENT DOCUMENTS 4,170,261 A * 10/1979 Laing et al. .................... 165/10

4,449,573 A * 5/1984 Pettersson et al. ............. 165/10
2002/0148602 A1 * 10/2002 Nakamura ................... 165/165

FOREIGN PATENT DOCUMENTS

JP  2003-336979  11/2003
JP  2004-271119  9/2004

* cited by examiner

*Primary Examiner*—Teresa J Walberg
(74) *Attorney, Agent, or Firm*—Rankin, Hill & Clark LLP

(57) ABSTRACT

A heat storing device for exchanging heat energy between a heat storing material and a fluid. The heat storing device has a heat storing module having heat storing material spaces filled with a heat storing material and fluid passages for a fluid to flow through adjacent to the heat storing material spaces. The heat storing module includes multiple plates in a stack. Each of the multiple plates has fluid passages in one side thereof. In mutually adjacent pairs of plates, the sides having the fluid passages face each other. When each pair of plates is seen face-on, with respect to the fluid passages of one of the plates, the fluid passages of the other plate intersect substantially at right angles, and the fluid passages of the two plates connect at these positions where they intersect.

11 Claims, 23 Drawing Sheets

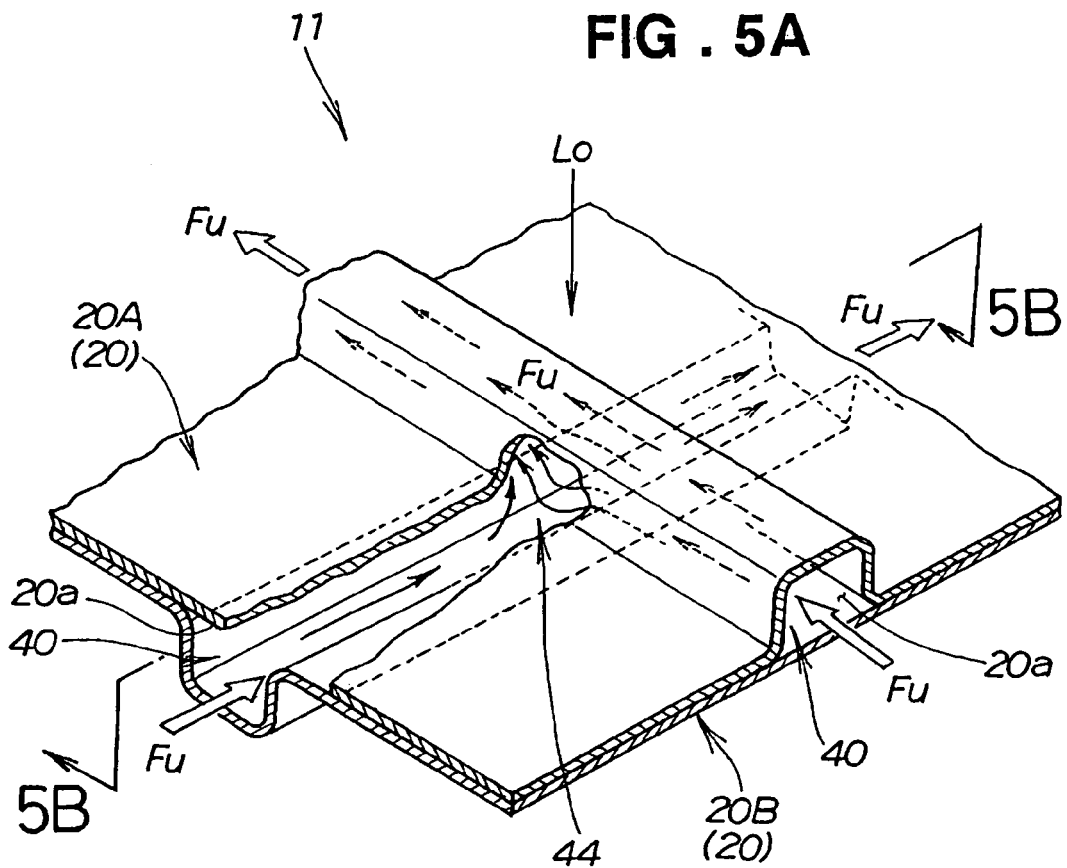
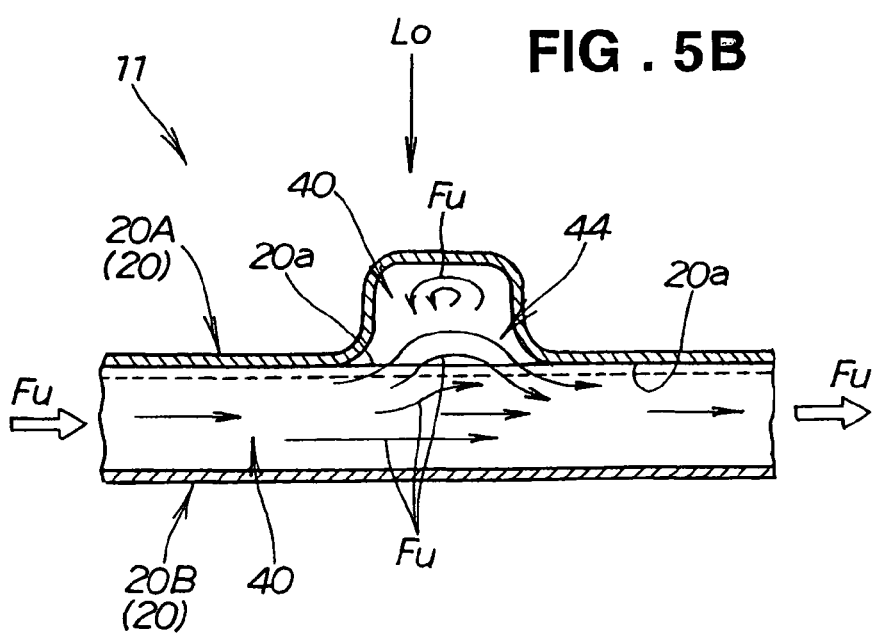

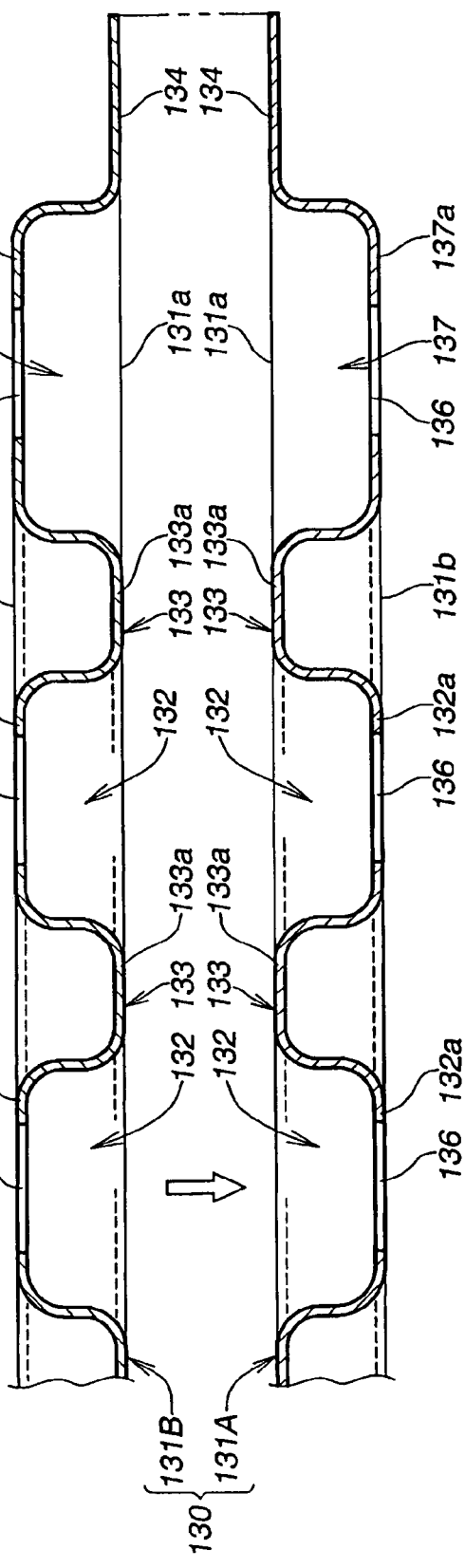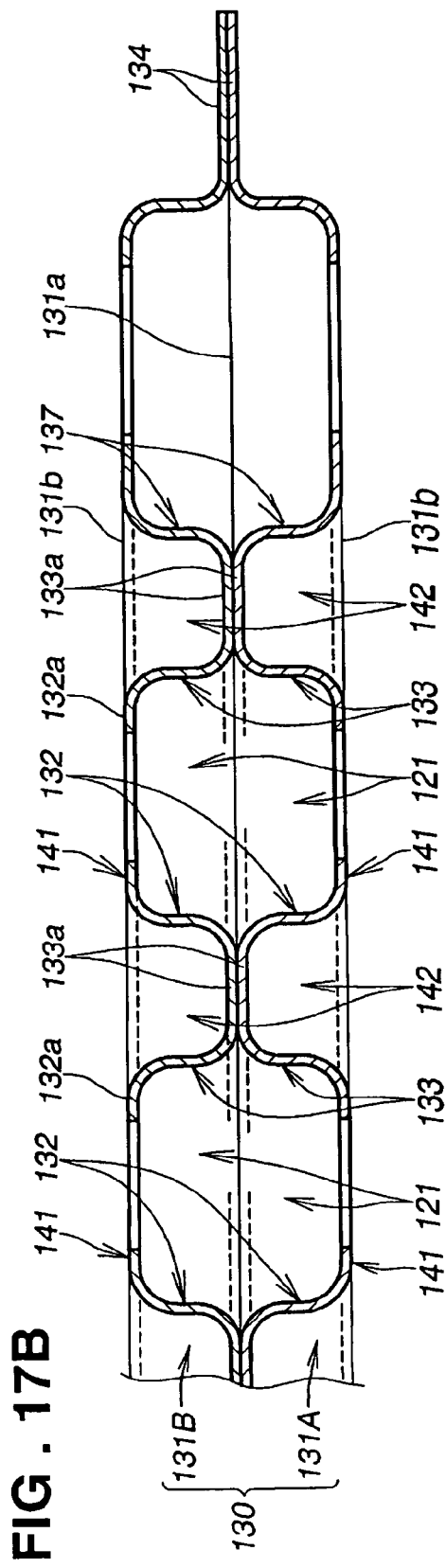

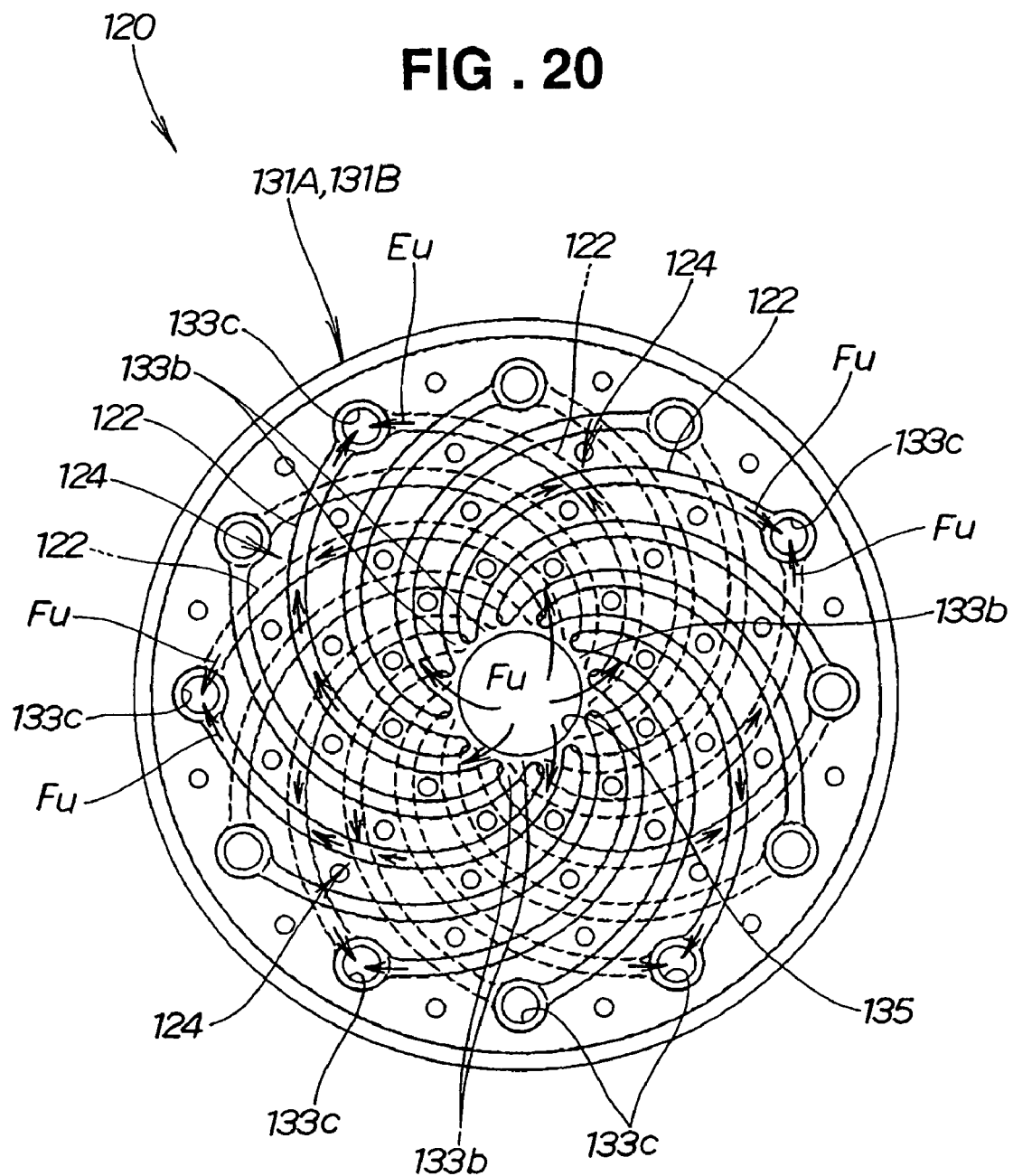

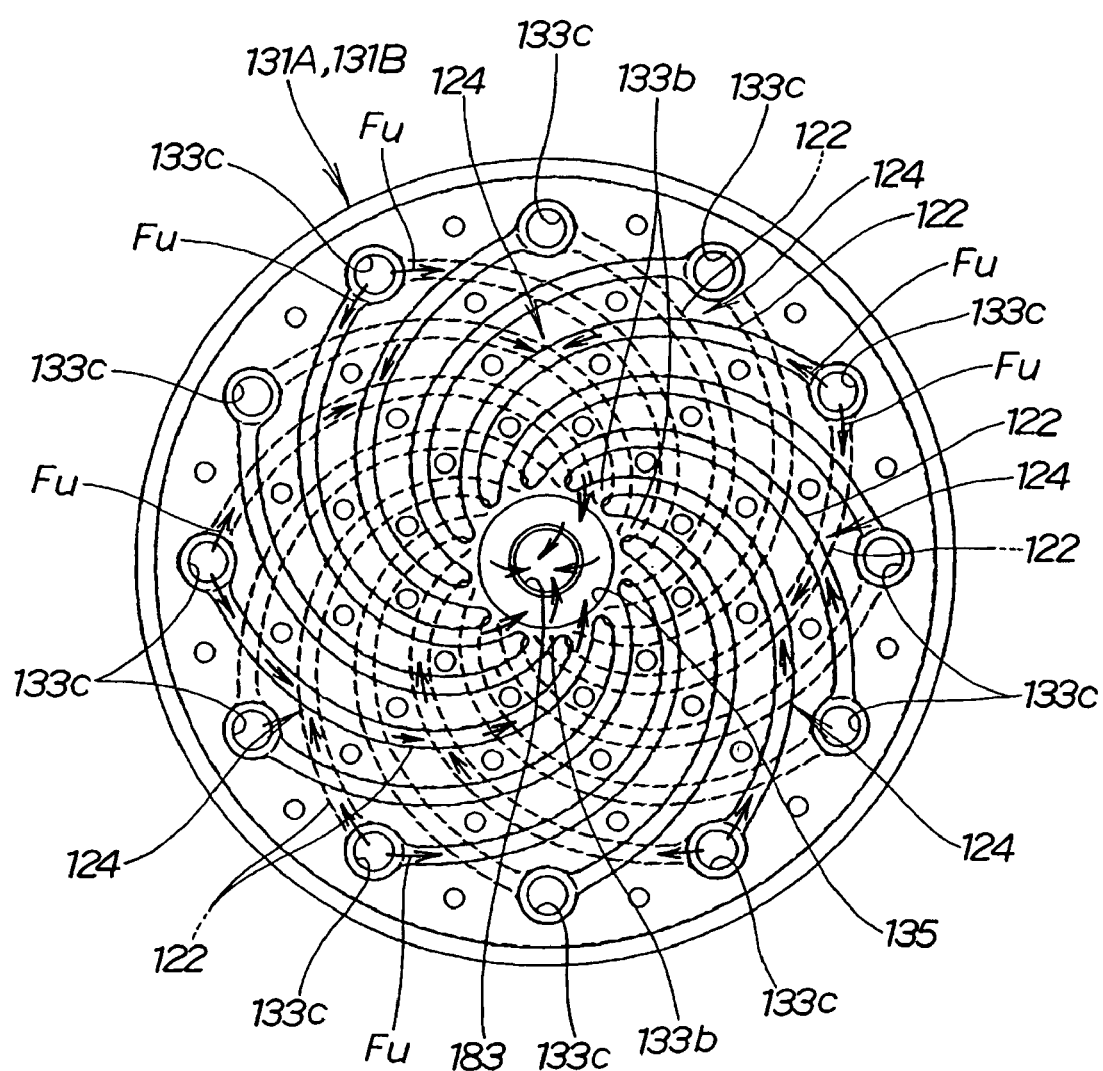

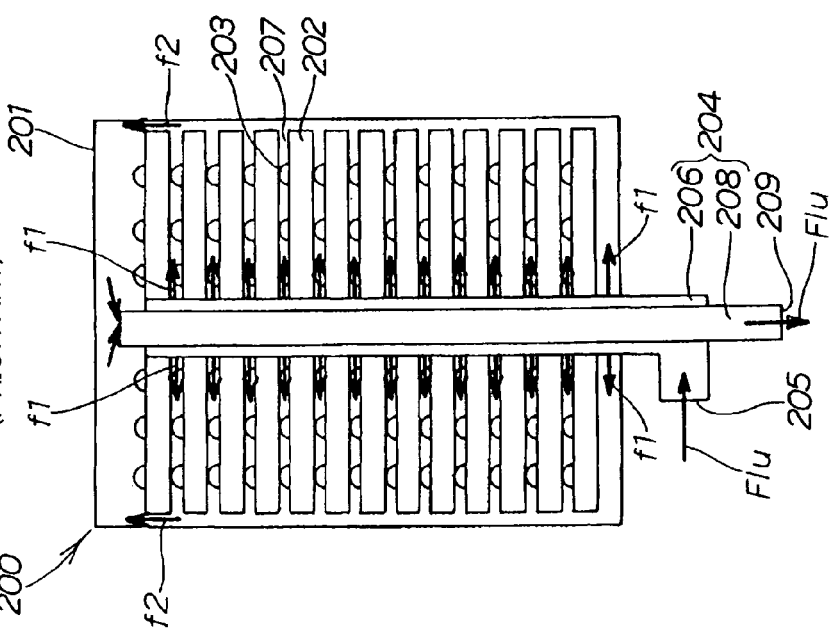
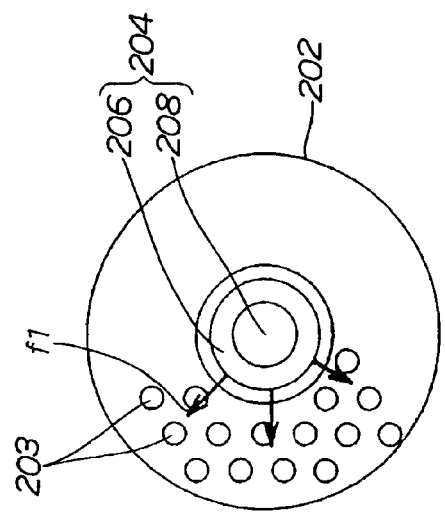
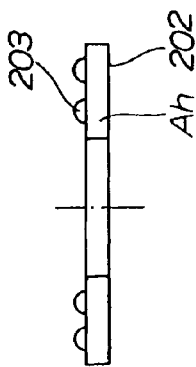
FIG. 22A (PRIOR ART)
FIG. 22B (PRIOR ART)
FIG. 22C (PRIOR ART)

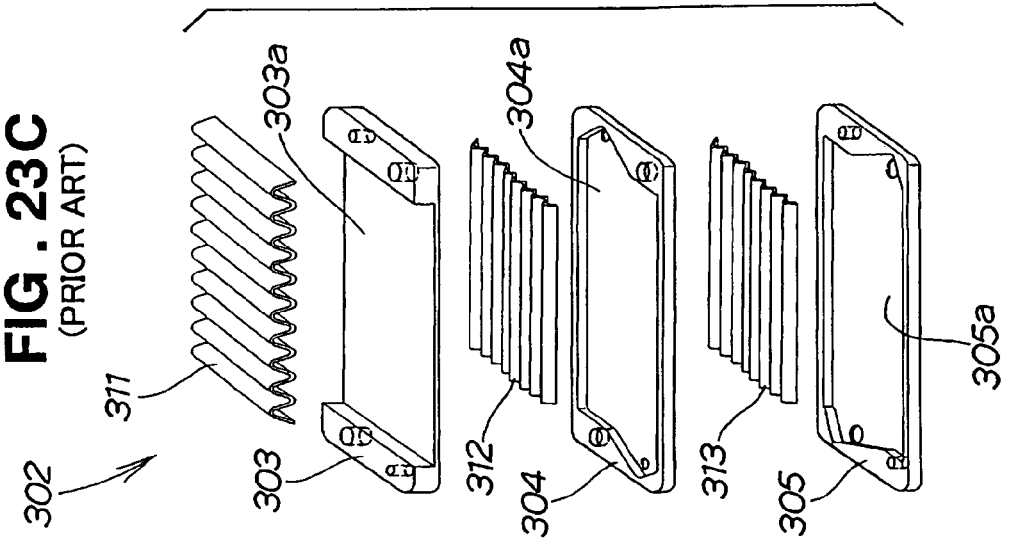
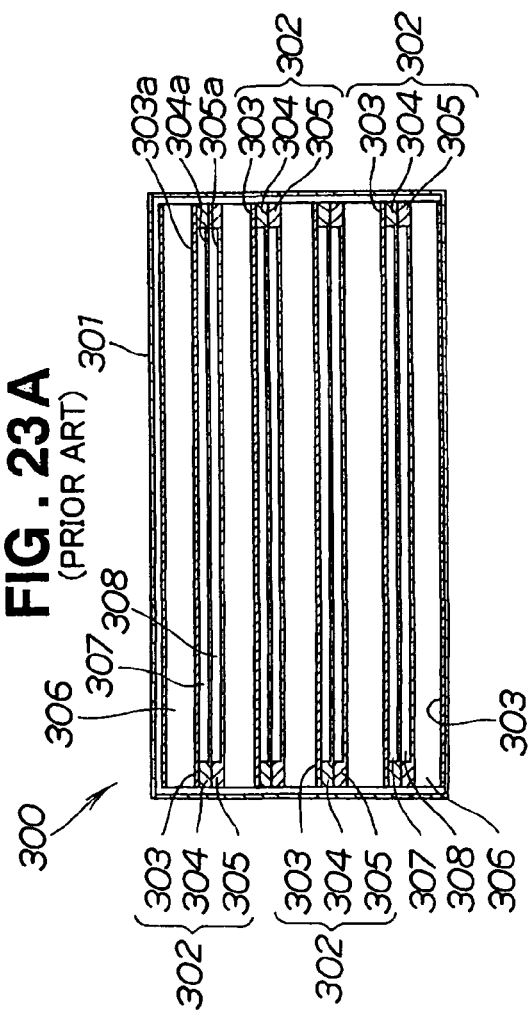
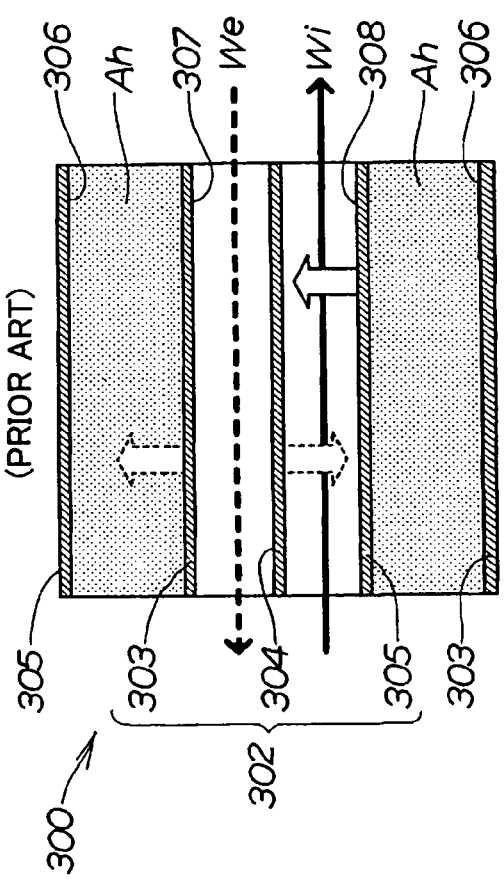
FIG. 23A (PRIOR ART)
FIG. 23B (PRIOR ART)
FIG. 23C (PRIOR ART)

US 7,406,998 B2

HEAT STORING DEVICE

FIELD OF THE INVENTION

This invention relates to a heat storing device for exchanging heat energy between a heat storing material and a heat exchange fluid.

BACKGROUND OF THE INVENTION

In recent years, the development of heat storing devices designed to achieve effective use of energy by transferring heat energy stored in a heat storing material to a heat exchange fluid such as cooling water has been being pursued. For example in an engine, whereas a lot of waste heat is produced while the engine is running, if heat is transferred to the engine at the time of starting, starting becomes smooth. By employing a heat storing device, it is possible to store waste heat while the engine is running and use it to warm up the engine at the time of starting. Various technologies for raising the heat exchange efficiency of this kind of heat storing device are known, as shown in JP-A-2004-271119 and JP-A-2003-336979.

Various technologies for raising the heat exchange efficiency of ordinary heat exchangers are also known, as shown in JP-A-5-149687.

The outline of a heat storing device disclosed in JP-A-2004-271119 will be described with reference to FIG. 22A to FIG. 22C, the outline of a heat storing device disclosed in JP-A-2003-336979 will be described with reference to FIG. 23A to FIG. 23C, and the outline of a heat storing device disclosed in JP-A-5-149687 will be described with reference to FIG. 24A and FIG. 24B.

FIG. 22A is a sectional view of a first heat storing device of related art, FIG. 22B is a plan view of a heat exchange plate and a double pipe shown in FIG. 22A, and FIG. 22C is a sectional view of a heat exchange plate shown in FIG. 22A.

In the first heat storing device of related art 200 shown in FIG. 22A to FIG. 22C, multiple annular heat exchange plates 202 are stacked with many spacers 203 between them inside a cylindrical sealed tank 201, and a double pipe 204 passes through the heat exchange plates 202 at the center of the cylindrical sealed tank 201. Internal spaces formed in the heat exchange plates 202 are filled with a heat storing material Ah (see FIG. 22C).

A fluid Flu introduced through an inlet 205 enters the outer pipe 206 of the double pipe 204 and flows radially outward through many openings in the outside of the outer pipe 206 as shown by the arrows f1, flows through the gaps 207 between the heat storing plates 202, 202 and exchanges heat with the heat storing material Ah, ascends as shown by the arrows f2 and enters the inner pipe 208 of the double pipe 204, and is guided out through an outlet 209.

With this heat storing device 200, by the fluid Flu flowing through the gaps 207 being disrupted by the many spacers 203, the efficiency of the heat exchange between the heat storing material Ah and the fluid Flu can be increased to some extent.

However, because the fluid Flu is just made to strike small semi-spherical spacers 203 projecting from the surfaces of the heat storing plates 202, it is not easy for the fluid Flu to be made turbulent. Thus, in raising the heat exchange efficiency with this kind of construction, there is room for improvement. To raise the heat exchange efficiency of the heat storing device 200 more, it is conceivable for example to employ technology disclosed in JP-A-2004-271119 and JP-A-2003-336979.

FIG. 23A shows schematically a second heat storing device of related art, FIG. 23B is a sectional view of the heat storing device shown in FIG. 23A, and FIG. 23C is an exploded view of a main part of the heat storing device shown in FIG. 23A.

As shown in FIG. 23A to FIG. 23C, this second heat storing device of related art 300 has multiple flat, plate-shaped units 302 stacked inside a sealed tank 301. The units 302 each consist of three plates in a stack, namely a first plate 303, a second plate 304 and a third plate 305.

These plates 303, 304 and 305 respectively have flat recesses 303a, 304a and 305a in their upper faces. The recess 303a in the first plate 303 forms a heat exchange material space 306, the recess 304a in the second plate 304 forms a waste heat hot water passage 307, and the recess 305a in the third plate 305 forms a supply hot water passage 308.

As shown in FIG. 23C, the recess 303a in the first plate 303 has a first heat transfer fin 311, the recess 304a in the second plate 304 has a second heat transfer fin 312, and the recess 305a in the third plate 305 has a third heat transfer fin 313. These heat transfer fins 311 to 313 are corrugated in shape.

As shown in FIG. 23B, waste heat hot water We flowing through the waste heat hot water passage 307 can exchange heat with a heat storing material Ah inside a heat exchange material space 306 while exchanging heat with supply hot water Wi flowing through the supply hot water passage 308. The supply hot water Wi flowing through the supply hot water passage 308 can exchange heat with a heat storing material Ah in a heat exchange material space 306 while exchanging heat with the waste heat hot water We.

With this heat storing device 300, by providing the first, second and third heat transfer fins 311 to 313, it is possible to increase the heat exchange efficiency to some extent. However, because the heat transfer fins 311 to 313 are provided, the manufacturing cost increases. By an amount corresponding to the heat transfer fins 311 to 313, the heat storing device 300 as a whole becomes large and its weight increases. Furthermore, because fluids (namely the waste heat hot water We and the supply hot water Wi) are being made to pass between large heat transfer fins 312 to 313, compared to the degree of the improvement in heat exchange efficiency, the degree of the increase in fluid pressure loss is extremely large.

FIG. 24A is a schematic exploded view of a heat exchanger of related art, and FIG. 24B is a sectional view of the heat exchanger shown in FIG. 24A.

As shown in FIG. 24A and FIG. 24B, this heat exchanger of related art 400 has an upper/lower pair of heat transfer plates 401, 401 brought face-to-face with each other across a fixed space 402 fluid passage 402). The upper/lower pair of heat transfer plates 401, 401 each have many thinly sliced heat transfer fins 403 extending across the fluid passage 402 to the proximity of the other plate 401. In this way, the heat transfer plates 401, 401 and the heat transfer fins 403 can be given a large heat transfer area with respect to the fluid flowing through the fluid passage 402.

With this heat exchanger 400, by the heat transfer fins 403 being made to incline regularly in the flow direction of the fluid and the opposite direction, turbulence can be created in the fluid passing between the heat transfer fins 403. As a result, the heat exchange efficiency can be raised.

However, with a heat exchanger 400 like this, because many thinly sliced heat transfer fins 403 are provided on upper and lower heat transfer plates 401, 401, the manufacturing cost increases. By an amount corresponding to the many heat transfer fins 403, the heat exchanger 400 as a whole becomes large and its weight increases. Furthermore, because a fluid is made to pass between large heat transfer fins 403, compared to the degree of the improvement in heat exchange efficiency, the degree of the increase in fluid pressure loss is extremely large.

As is clear from the foregoing explanation, the technology of the heat storing device 300 of related art shown in FIG. 23A to FIG. 23C or the heat storing device 400 of related art shown in FIG. 24A and FIG. 24B cannot be employed as it is in the heat storing device 200 of related art shown in FIG. 22A to FIG. 22C, and there is room for further improvement.

Accordingly, technology has been awaited with which it is possible greatly to increase the efficiency of heat exchange between the heat storing material and the fluid while making the heat storing device low-cost and minimizing fluid pressure losses.

SUMMARY OF THE INVENTION

According to the present invention, there is provided a heat storing device for exchanging heat energy between a heat storing material and a fluid, which comprises: a heat storing module having heat storing material spaces filled with the heat storing material; and fluid passages for the fluid to flow through adjacent to the heat storing material spaces, wherein the heat storing module includes multiple flat plates in a stack, each of the plates has the fluid passages in one side thereof, mutually adjacent pairs of the plates are brought together so that their faces having the fluid passages face each other, the fluid passages of a first plate of the pair and the fluid passages of a second plate of the pair intersect substantially at right angles, and the fluid passages intersecting at right angles communicate with each other at positions where they intersect.

In a heat storing device according to the invention, by the fluid passages in the second plate intersecting substantially at right angles with the fluid passages in the first plate and the fluid passages connecting at these positions where they intersect like this, the flows of fluid flowing through the mutually intersecting fluid passages can be made to mix energetically at the intersection positions. That is, by means of the mutually intersecting flows of fluid it is possible to create eddy currents swirling eddies in a roughly fixed direction in the fluid. Because of the fluid forming eddy currents, the efficiency of heat exchange between the heat storing material and the fluid increases, the heat transfer area can be decreased by a corresponding amount. And because the heat transfer area is lower, the heat storing device can be made smaller and lighter.

Furthermore, because all that is being done is that mutually intersecting flows of fluid are being made to mix energetically at the intersection positions and create eddy currents (mutually opposite eddy currents) swirling eddies in a fixed direction, pressure loss of the fluid can be kept down. Therefore, it is possible to provide a high-performance heat storing device with increased heat exchange efficiency and low pressure loss of the fluid.

Also, the fluid can be made to form eddy currents easily by means of the simple construction of just making mutually intersecting fluid passages connect at the positions where they intersect with each other. A heat storing device with good heat exchange efficiency can be produced cheaply.

In this way it is possible to raise the efficiency of heat exchange between the heat storing material and the fluid while making the cost of the heat storing device low.

Preferably, each of the multiple plates has the heat storing material spaces in a side opposite from the fluid passages.

Desirably, each of the plates comprises a quadrilateral plate having a multiplicity of the fluid passages formed by substantially straight channels extending between two mutually opposite sides of the four sides of the quadric-lateral. In this case, mutually intersecting fluid passages of the stacked plates can be easily made to connect at the positions where they intersect. The structure for making them connect can be made simpler.

In a preferred form, the heat storing device further includes one fluid inlet header fronting onto two adjacent sides of the quadrilateral and one fluid outlet header fronting onto the other two sides of the stack of the quadrilateral plates, the fluid inlet header communicating with one end of each fluid passage and the fluid outlet header communicating with the other end of each fluid passage. In this case, one fluid inlet header can be connected to one end of all of the mutually intersecting fluid passages. From the one fluid inlet header, fluid can be distributed to this one end of all of the mutually intersecting fluid passages. One fluid outlet header can be connected to the other end of all of the mutually intersecting fluid passages. Fluid can be collected from the other end of all of the mutually intersecting fluid passages and guided out by one fluid outlet header. Accordingly, only one each of the member for guiding fluid into the multiple fluid passages from outside and the member for guiding the fluid from the fluid passages to outside are needed, the number of parts is low and the heat storing device can be made simple.

Preferably, a blocking plate is further provided between the fluid inlet header and the multiple plates and between the fluid outlet header and the multiple plates for blocking off the ends of the heat storing material spaces from the ends of the fluid passages. In this case, by the simple construction of just providing blocking plates, the ends of the heat storing material spaces and the ends of the fluid passages adjacent to these heat storing material spaces can be blocked off from each other easily with the blocking plates.

Desirably, the positions where the multiple fluid passages intersect are arrayed with a fixed pitch. In this case, eddy currents can be created at intervals of the fixed pitch in the fluid flowing through the flow passages. And because eddy currents are created in many locations, the efficiency of heat exchange between the heat storing material and the fluid can be increased further.

Preferably, the second plate is designed to assume the same shape as the first plate when turned upside-down with respect to the first plate and changed in phase through 90° with respect to the first plate. In this case, the first plate and the second plate can be used commonly. Therefore, because only one type of plate is needed, the manufacturing cost can be lowered.

Preferably, the fluid passages comprise spiral-shaped recesses and in each of the pairs of plates the spiral direction of the fluid passages in the second plate is opposite to the spiral direction of the fluid passages in the first plate.

Preferably, the second plate is formed so that it assumes the same shape as the first plate when turned upside-down with respect to the first plate. In this case, the first plate and the second plate can be used commonly. Therefore, because only one type of plate is needed, the manufacturing cost can be lowered.

It is desirable that when the plates are seen face-on, the mutually oppositely spiraling fluid passages intersect substantially at right angles.

BRIEF DESCRIPTION OF THE DRAWINGS

Certain preferred embodiments of the present invention will be described in detail below, by way of example only, with reference to the accompanying drawings, in which:

FIG. 5A and FIG. 5B are views showing an upper/lower pair of plates shown in FIG. 1 stacked to form intersecting fluid passages;

FIG. 17A and FIG. 17B are sectional detail views of the one element shown in FIG. 15;

FIG. 20 illustrates an operation of an upper heat storing module of FIG. 11 as seen from above;

FIG. 21 illustrates an operation of a lower heat storing module of FIG. 11 as seen from above;

FIG. 22A to FIG. 22C are schematic views of a first heat storing device of related art;

FIG. 23A to FIG. 23C are schematic views of a second heat storing device of related art.

DETAILED DESCRIPTION OF THE PREFERRED EMBODIMENTS

FIGS. 1 to 10 illustrate a heat storing device according to a first preferred embodiment of the present invention.

Figure 1:
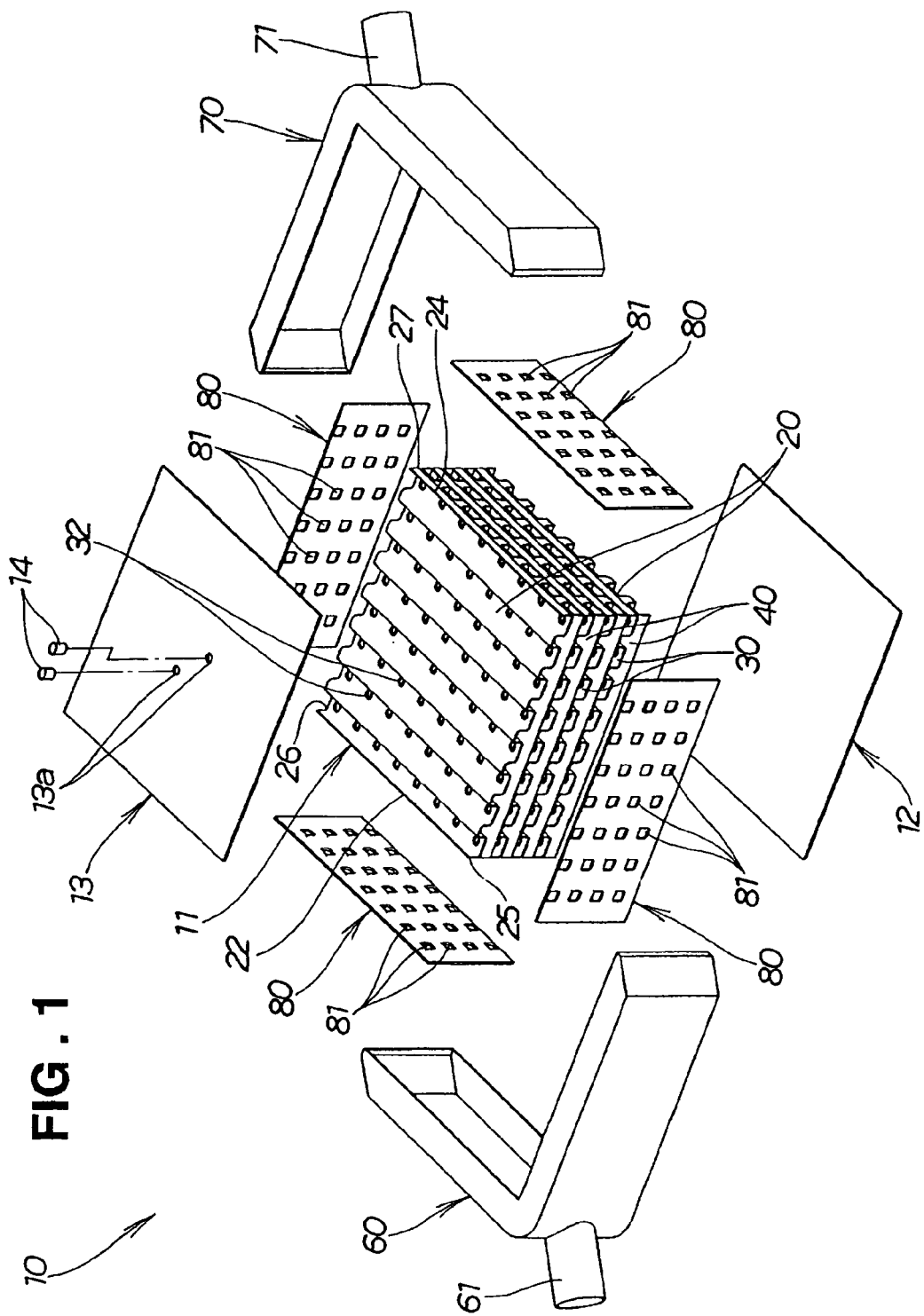
FIG. 1 is an exploded view of a heat storing device according to a first preferred embodiment of the invention.

As shown in FIG. 1, the heat storing device 10 of this first preferred embodiment is made up of a heat storing module 11, a bottom plate 12 for covering a lower face of the heat storing module 11, a top plate 13 for covering an upper face of the heat storing module 11, a fluid inlet header 60 and a fluid outlet header 70 for covering side faces of the heat storing module 11, and four blocking plates 80 interposed between the side faces of the heat storing module 11 and the headers 60 and 70.

First the heat storing module 11 will be described, and after that the other members 12, 13 and 60 to 80 will be described.

The heat storing module 11 is made up of multiple flat plates 20 in a stack and integrally has multiple heat storing material spaces 30 and multiple fluid passages 40. The plates 20 will be described below.

Figure 2:
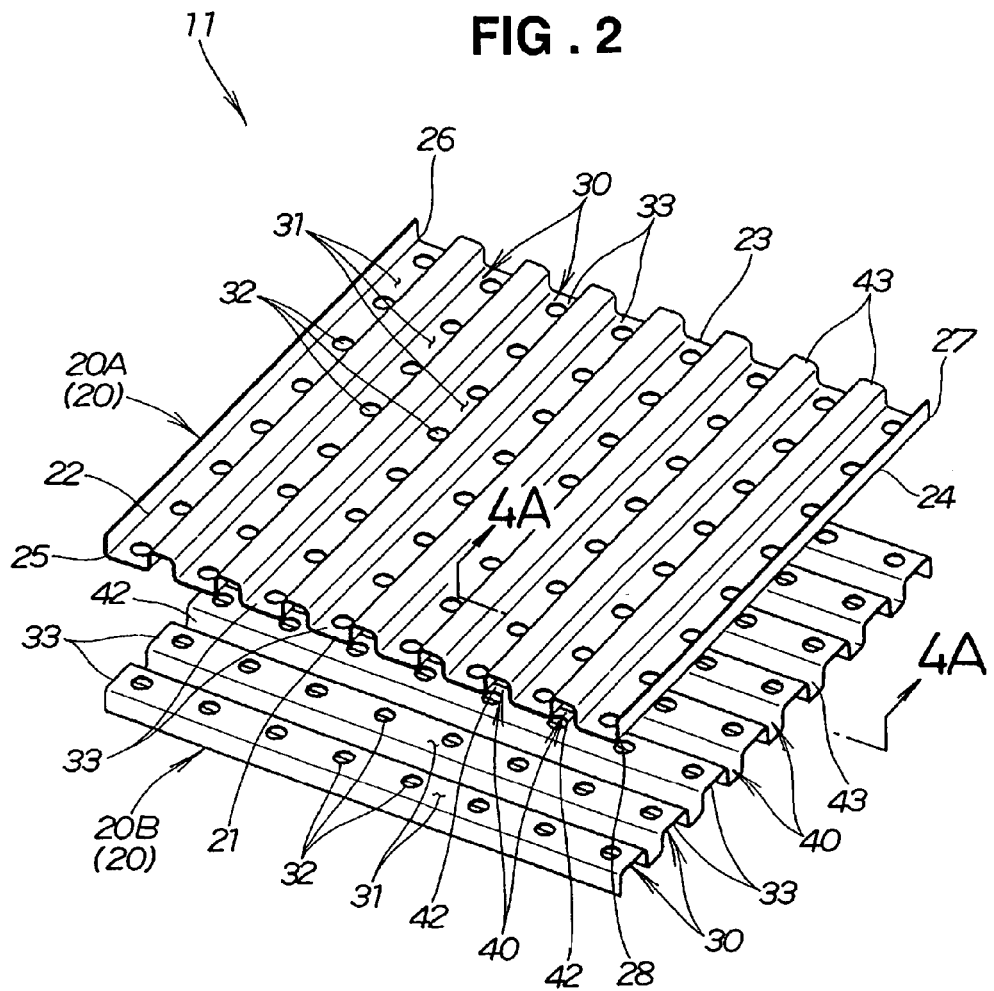
FIG. 2 is an exploded perspective view of an upper/lower pair of plates of a heat storing module shown in FIG. 1.
Figure 3:
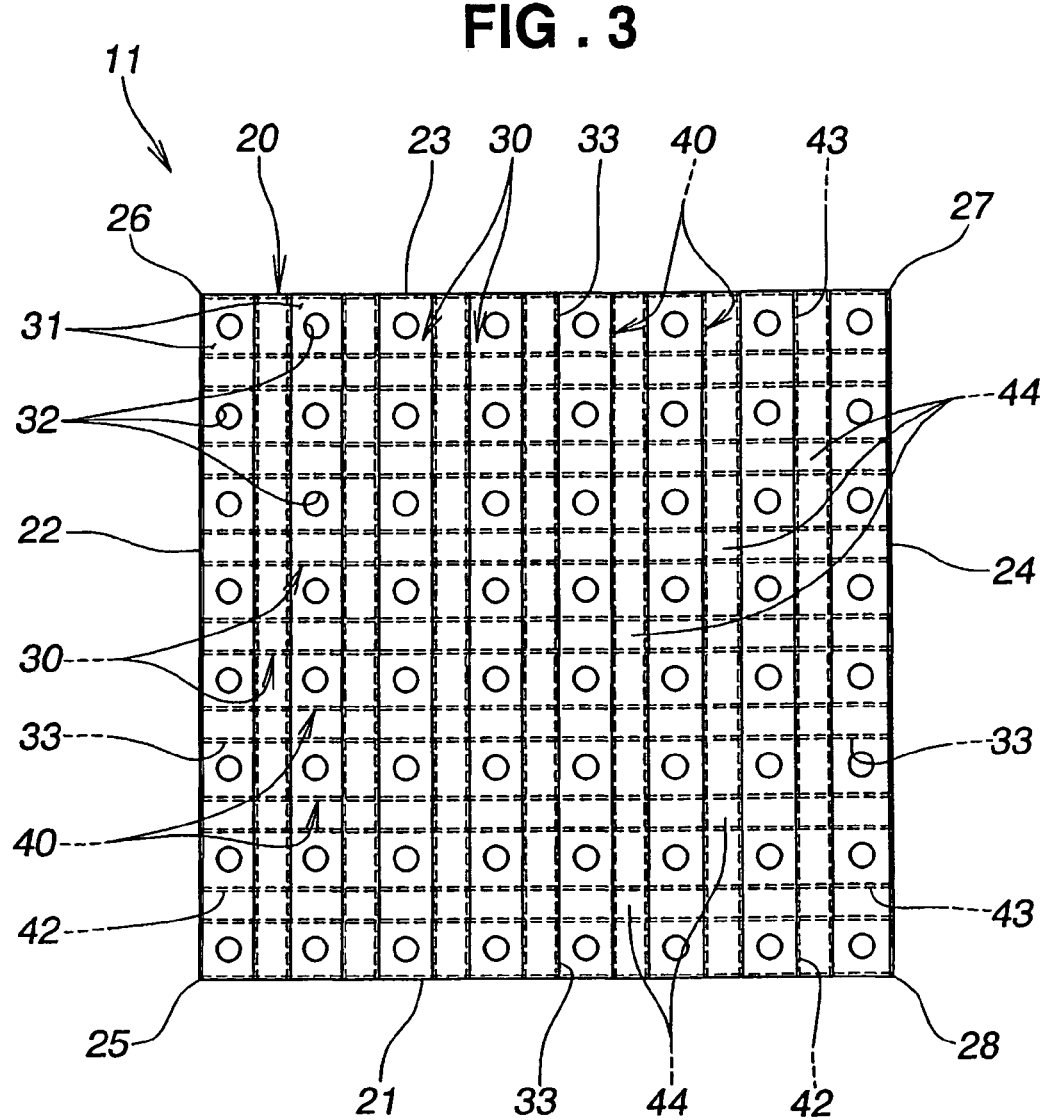
FIG. 3 is a plan view of the heat storing module shown in FIG. 1.

As shown in FIG. 2 and FIG. 3, each of the multiple plates 20 is a quadrilateral plate. This quadrilateral is preferably a square (including rectangles) with all four internal angles right angles, and most preferably it is a regular square. In the following, the example of a construction wherein the multiple plates 20 are regular squares will be described.

As shown in FIG. 3, reference numbers will be assigned to the four sides of the plates 20, and in clockwise order in the figure they will be called the first side 21, the second side 22, the third side 23 and the fourth side 24. Of the four sides 21 to 24, the first side 21 and the third side 23 are two sides that face each other. The two sides other than these two sides 21, 23, that is, the second side 22 and the fourth side 24, are also two mutually opposite sides.

The angle 25 between the first side 21 and the second side 22 will be called the first angle 25, the angle 26 between the second side 22 and the third side 23 will be called the second angle 26, the angle 27 between the third side 23 and the fourth side 24 will be called the third angle 27, and the angle 28 between the fourth side 24 and the first side 21 will be called the fourth angle 28. These angles 25 to 28 are all right angles.

As shown in FIG. 2, of an upper/lower pair of plates 20, 20, the plate 20 on the upper side will be called the first plate 20A and the plate 20 on the lower side will be called the second plate 20B. The first plate 20A is a first plate referred to in the claims, having multiple channel-shaped heat storing material spaces 30 and multiple channel-shaped fluid passages 40.

As shown in FIG. 2 and FIG. 3, the heat storing material spaces 30 and the fluid passages 40 are approximately straight passages disposed parallel with each other, and are arrayed alternating one by one. By being arrayed like this, each of the fluid passages 40 can be individually made adjacent to heat storing material spaces 30.

The heat storing material spaces 30 are arrayed with a fixed, uniform pitch and the fluid passages 40 are also arrayed with a fixed, uniform pitch. These heat storing material spaces 30 and fluid passages 40 consist of channels formed in approximately straight lines running between two mutually opposite sides, namely from the first side 21 to the third side 23.

The second plate 20B is a second plate referred to in the claims, which when front-rear inverted with respect to the first plate 20A and changed in phase through 90° with respect to the first plate 20A becomes the same shape as the first plate 20A. That is, the second plate 20B is exactly the same member as the first plate 20A, disposed front-rear inverted and turned through 90°.

Because the second plate 20B of the pair of plates 20A and 20B, has been made so as to become the same shape as the first plate 20A when front-rear inverted and turned through 90° with respect to the first plate 20A like this, the first plate 20A and the second plate 20B can be used commonly. Therefore, only one of the plates need be prepared. Consequently, it is possible to keep down the variety of members constituting the heat storing device 10, and as a result, it is possible to lower its manufacturing cost.

Because the phase has been changed by 90°, when this pair of plates 20A, 20B is seen from face-on (that is, when they are seen in the front-rear direction of the paper of FIG. 3), the heat storing material spaces 30 and the fluid passages 40 in the second plate 20B intersect substantially at right angles with the heat storing material spaces 30 and the fluid passages 40 in the first plate 20A. Herein, "intersect substantially at right angles" includes the case of intersecting completely at right angles.

The heat storing material spaces 30 each have multiple heat storing material flow holes 32 passing through them in the up-down direction with a fixed pitch in the length direction (that is, passing through them in the plate thickness direction). The heat storing material flow holes 32 constitute heat storing material flow holes of the heat storing module 11 as a whole.

Figure 4A:
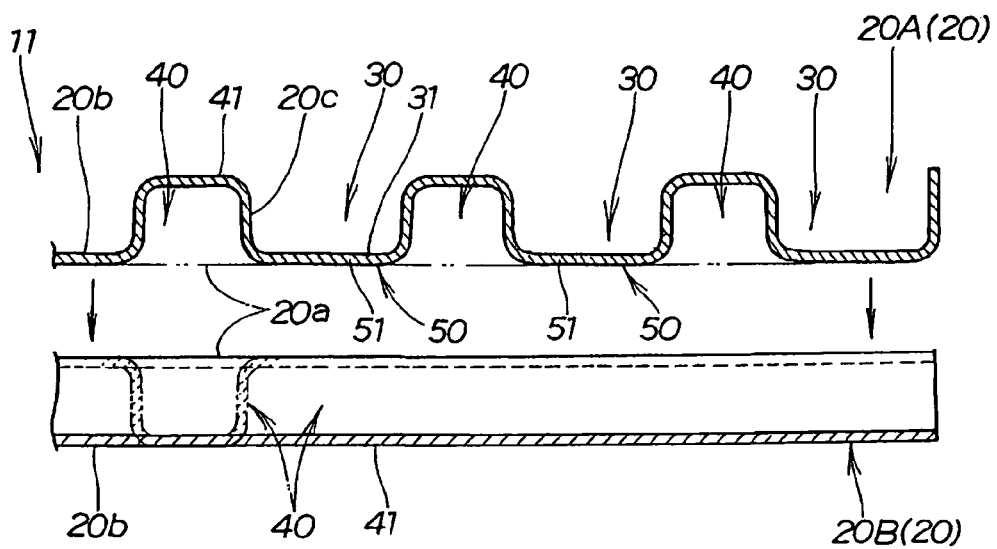
FIG. 4A and FIG. 4B are detail views of the heat storing module shown in FIG. 1.
Figure 4B:
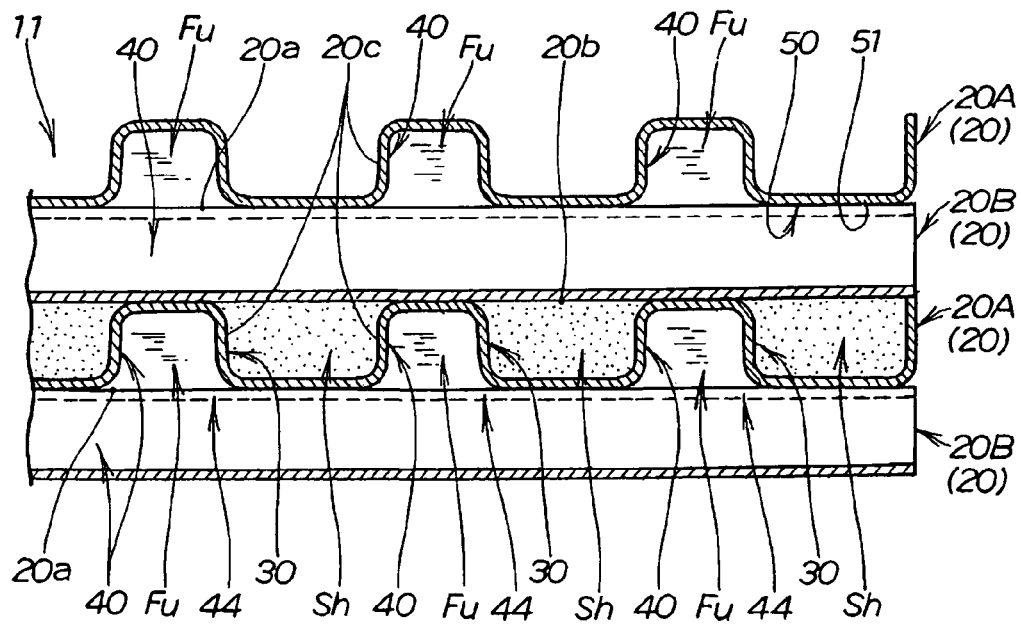

Next, the assembly structure of the upper/lower pair of plates 20A, 20B will be described in more detail. FIG. 4A shows the upper/lower pair of plates in a section on the line 4A-4A in FIG. 2. FIG. 4B shows two of the upper/lower pairs of plates shown in FIG. 4A in a stack.

As shown in FIG. 2 and FIG. 4A, the first plate 20A on the upper side has multiple fluid passages 40 formed on a horizontal lower side plate face 20a (the face 20a facing the second plate 20B) and multiple heat storing material spaces 30 formed on a horizontal upper side plate face 20b (the other face 20b). This first plate 20A is for example a press-formed part made from a metal plate material such as aluminum alloy.

Explaining this in more detail, the first plate 20A has fluid passages 40 sunk upward from the lower-side plate face 20a and ridge strips 50 having ridge faces 51 (bottoms 51) coplanar with the lower-side plate face 20a, at the plate face 20a and arrayed alternately in a transverse line. The each of the fluid passages 40 and the ridge strips 50 is an approximately right-angled quadric-lateral in cross-sectional shape. The bottoms 41 of the fluid passages 40 and the ridge faces 51 of the ridge strips 50 are flat parts parallel with the plate face 20a.

As mentioned above, because the first plate 20A is a press-formed sheet, when the ridge strips 50 are seen from the side of the upper plate face 20b, their projecting shape is inverted. That is, the rear side parts of the ridge strips 50 in the first plate 20A are sunk. These sunk parts (that is, channels) on the rear side constitute heat storing material spaces 30.

Of the multiple plates 20, the plate faces 20a, 20a, which have the fluid passages 40, of pairs of plates 20A, 20B which are mutually adjacent, are stacked so as to be face-to-face.

When the multiple first plates 20A, 20A and the multiple second plates 20B, 20B are stacked against each other, the multiple fluid passages 40 and the multiple ridge strips 50 are brought face-to-face with each other. FIG. 4B shows ridge faces 51, 51 having been brought together.

By the ridge faces 51, 51 of the ridge strips 50, 50 being joined in this state, the plates 20, 20 can be joined, and a heat storing module 11 thereby constructed. The joining may be by welding, brazing or bonding or the like.

By this construction being adopted, the heat storing material spaces 30 in the first plate 20A become spaces divided by the plate face 20a of the second plate 20B. The heat storing material spaces 30 in the second plate 20B become spaces divided by the plate face 20a of the first plate 20A. These heat storing material spaces 30 are filled with a heat storing material Sh.

On the other hand, the fluid passages 40 in the first plate 20A become spaces divided by the plate face 20a of the second plate 20B. The fluid passages 40 in the second plate 20B become spaces divided by the plate face 20a of the first plate 20A. These fluid passages 40 are for a fluid Fu to pass through.

The heat storing material Sh may be any material that makes a phase change from liquid to a solid (a latent heat storing material). More specifically, it may be paraffin, a sugar alcohol such as erythritol, xylitol or sorbitol, or a chlorohydrate such as magnesium nitrate 6 hydrate or the like.

The fluid Fu is a liquid that can exchange heat with the heat storing material Sh, i.e. a heat exchange fluid (a coolant or a heating medium), and is for example cooling water for cooling an engine. The fluid Fu may be cold water or hot water.

The fluid passages 40 are adjacent to the heat storing material spaces 30 and are narrower spaces than the heat storing material spaces 30. Because the heat storing material spaces 30 and the fluid passages 40 are divided from each other by walls 20c, they are not continuous with each other. These walls 20c also perform the role of heat transfer plates for exchanging heat between the heat storing material spaces 30 and the fluid passages 40. The thickness of the walls 20c, because it corresponds to one plate thickness of either of the first and second plates 20A, 20B, is extremely thin. Also, because the walls 20c consist of one plate, they are of a uniform thickness. As a result, because the exchange of heat energy can be carried out uniformly between the heat storing material Sh in the heat storing material spaces 30 and the fluid Fu flowing through the fluid passages 40, the heat exchange efficiency can be increased further.

As shown in FIG. 2, FIG. 5A and FIG. 5B (a sectional view on the line 5B-5B in FIG. 5A), the fluid passages 40 formed in the first plate 20A are long, narrow channels with their lower sides open. The fluid passages 40 formed in the second plate 20B are long, narrow channels with their upper sides open. Because of this, upper/lower pairs of fluid passages 40, 40 connect at positions where they intersect with each other. That is, upper/lower pairs of fluid passages 40, 40 have connecting parts 44 where they connect with each other.

As shown in FIG. 2 and FIG. 5A and FIG. 5B, when the pairs of plates 20A, 20B are seen face-on (from the arrow Lo side in FIG. 5A), with respect to the fluid passages 40 in the first plate 20A, the fluid passages 40 in the second plate 20B intersect roughly at right angles. These fluid passages 40, 40 intersecting at right angles with each other connect at the positions where they intersect.

As described above, the multiple fluid passages 40 are arrayed at a fixed uniform pitch. Therefore, as shown in FIG. 2 and FIG. 3, the positions where the fluid passages 40 intersect at right angles between pairs of plates 20A, 20B are multiple positions arrayed with a fixed pitch.

Next, the other members of the heat storing device 10 of this first preferred embodiment will be described.

As shown in FIG. 1, the bottom plate 12 is a flat plate with its peripheral shape matched to that of the heat storing module 11. The top plate 13 is a flat plate with its peripheral shape matched to that of the heat storing module 11 and having two filling holes 13a, 13a. These filling holes 13a, 13a are through holes aligned with the positions of heat storing material flow holes 32 in the heat storing module 11, and double as air-escape holes. After all of the heat storing material spaces 30 are filled with the heat storing material Sh (see FIG. 4B) through one of the filling holes 13a, the filling holes 13a, 13a are closed with plugs 14, 14.

The bottom plate 12 and the top plate 13 are metal parts made of for example aluminum alloy or are resin moldings or the like. The contacting faces of the heat storing module 11, the bottom plate 12 and the top plate 13 can be sealed and assembled integrally to each other by brazing, welding or bonding or the like. They may be sealed by the insertion of packings.

Figure 6:
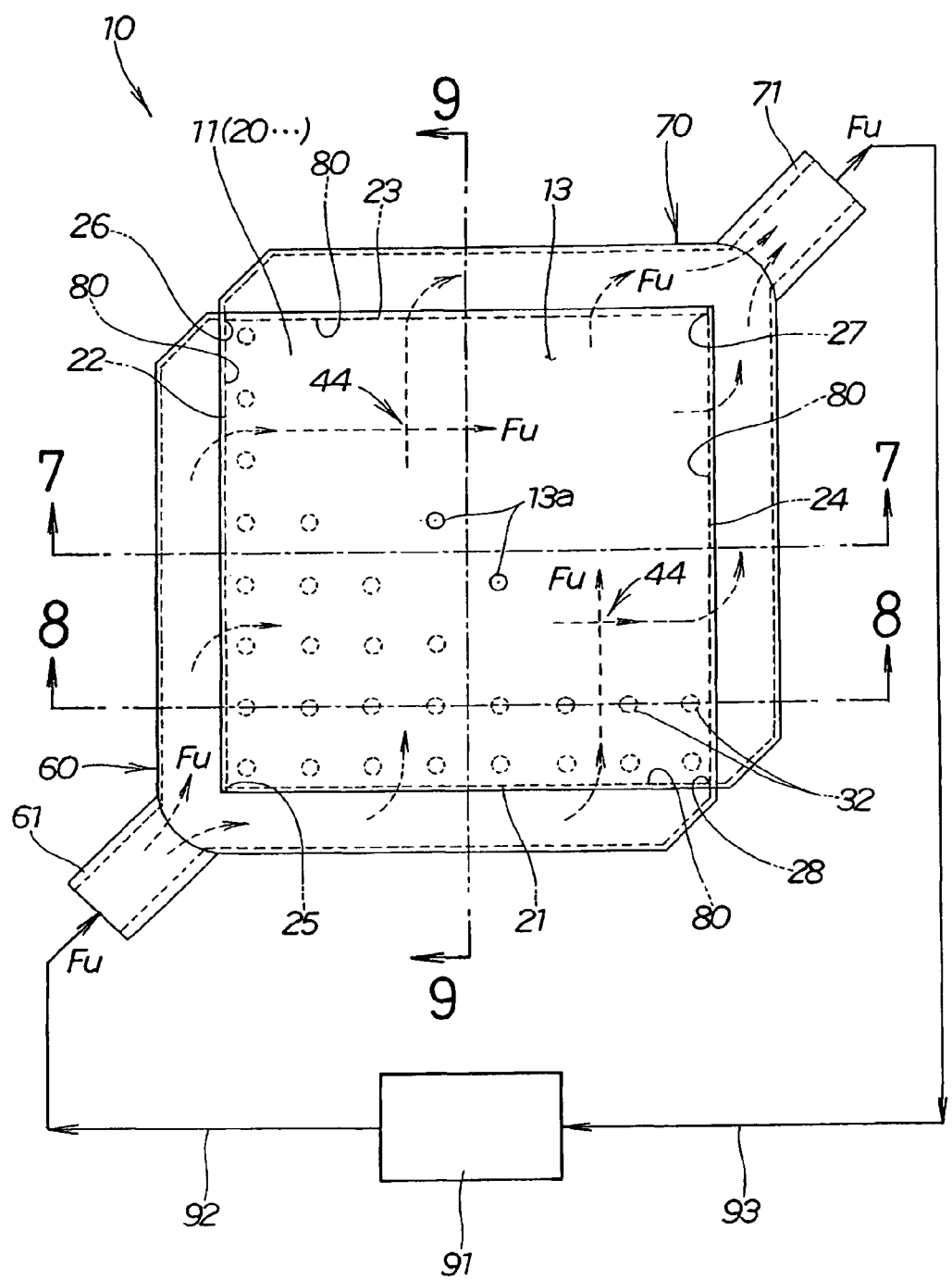
FIG. 6 is a plan view of a heat storing device according to the first preferred embodiment.

As shown in FIG. 1 and FIG. 6, the heat storing device 10 has the fluid inlet header 60, which covers the whole of the first sides 21 and the second sides 22 of the plates 20. FIG. 1 and FIG. 6 also illustrate the fluid outlet header 70, which covers the whole of the third sides 23 and the fourth sides 24. FIG. 1 and FIG. 6 further show the four blocking plates 80, which are placed at the four sides of the plates 20.

As shown in FIG. 1 and FIG. 6 to FIG. 9, the fluid inlet header 60 has an approximate L-shape in plan view so that it connects together first ends 42 of the fluid passages 40 formed in the plates 20 and intersecting at right angles with each other, and has an inlet port 61 at its corner.

This fluid inlet header 60 is a cross-sectionally C-shaped body opening to the plates 20 side, and by being placed so as to cover the first sides 21 and the second sides 22 of the plates 20 it can guide the fluid Fu into the first ends 42 of all of the fluid passages 40.

The fluid outlet header 70 has an approximate L-shape in plan view so that it connects together second ends 43 of the fluid passages 40 intersecting at right angles with each other, and has an outlet port 71 at its corner.

This fluid outlet header 70 is a cross-sectionally C-shaped body opening to the plates 20 side, and by being placed so as to cover the third sides 23 and the fourth sides 24 of the plates 20 it can guide the fluid Fu out from the second ends 43 of all of the fluid passages 40.

For example, as shown in FIG. 6, the inlet port 61 can be connected by a hose 92 to the outlet of a water-cooling jacket of an engine 91, and the outlet port 71 connected by a hose 93 to the inlet of the water-cooling jacket.

As shown in FIG. 1 and FIG. 6 to FIG. 10, the four blocking plates 80 are members for blocking off the ends 33 (see FIG. 8) of the heat storing material spaces 30 from the ends 42, 43 of the fluid passages 40 (see particularly FIG. 7, FIG. 9) and the headers 60, 70. The blocking plates 80 are provided between the fluid inlet header 60 and the plates 20 and between the fluid outlet header 70 and the plates 20. Each of these blocking plates 80 is a flat plate having many through holes 81 corresponding to the ends 42 or 43 of the fluid passages 40.

In this way, by the simple construction of just providing the blocking plates 80 between the fluid inlet header 60 and the plates 20 and between the fluid outlet header 70 and the plates 20, the ends 33 of the heat storing material spaces 30 can be blocked off easily from the ends 42, 43 of the fluid passages 40 adjacent to these heat storing material spaces 30. Also, the ends 33 of the heat storing material spaces 30 can be blocked off easily from the headers 60, 70. Accordingly, the heat storing material Sh in the heat storing material spaces 30 and the fluid Fu passing through the headers 60, 70 and the fluid passages 40 can be blocked off from each other completely and easily.

Next, the operation of the heat storing device 10 of this first preferred embodiment will be explained.

Figure 7:
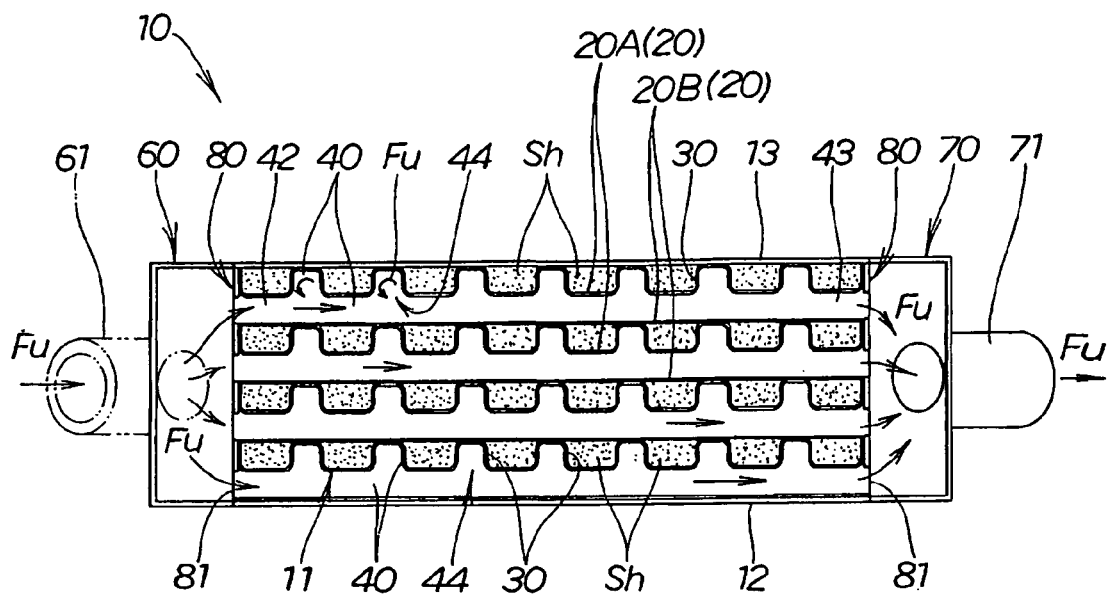
FIG. 7 is a sectional view taken along line 7-7 in FIG. 6.
Figure 8:
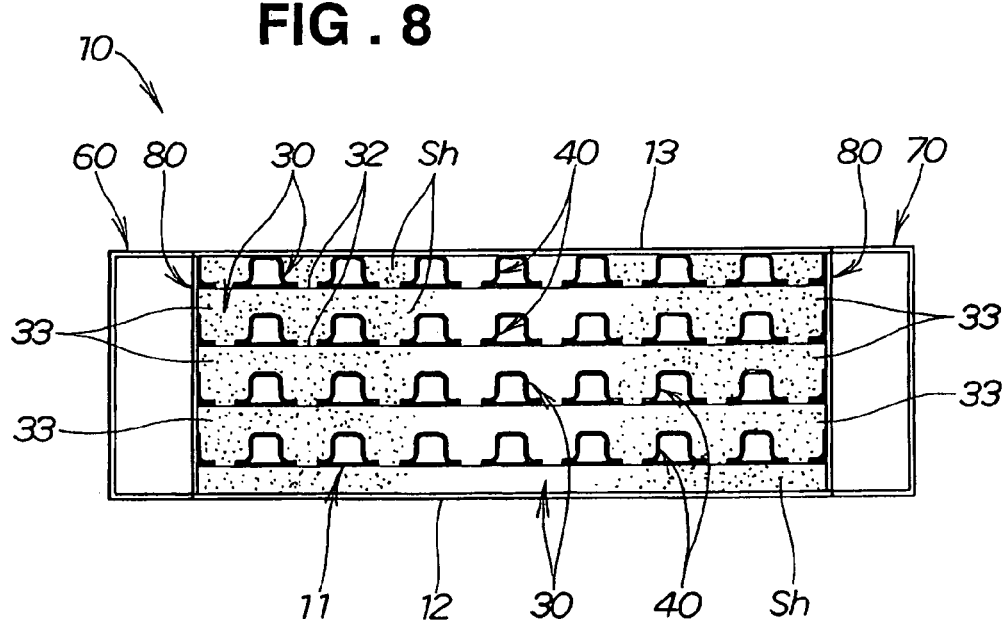
FIG. 8 is a sectional view taken along line 8-8 in FIG. 6.
Figure 9:
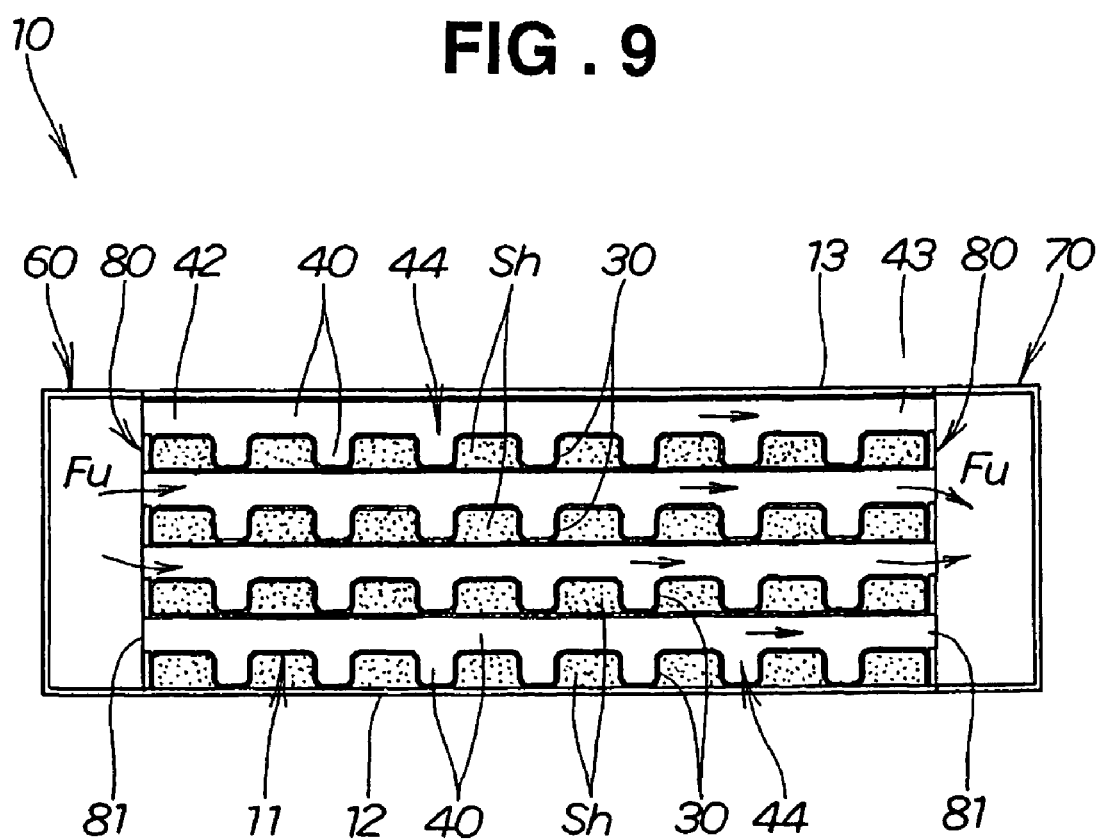
FIG. 9 is a sectional view taken along line 9-9 in FIG. 6.

As shown in FIG. 6, FIG. 7 and FIG. 9, hot fluid Fu having cooled the engine 91 enters the inlet port 61 from the water-cooling jacket through the hose 92, passes through the fluid inlet header 60 and the two blocking plates 80, 80, and flows into the heat storing module 11.

Then, inside the heat storing module 11, the fluid Fu enters the first ends 42 (see FIG. 7, FIG. 9) of the fluid passages 40 intersecting with each other at right angles, passes inside the fluid passages 40 along the straight channels, and flows to the second ends 43 (see FIG. 7, FIG. 9).

The fluid Fu then passes from the second ends 43 through those two blocking plates 80, 80 and the fluid outlet header 70 and returns to the water-cooling jacket of the engine 91 from the outlet port 71 via the hose 93.

In this way, in the heat storing module 11, heat is exchanged between the heat storing material Sh in the heat storing material spaces 30 and the fluid Fu flowing through the fluid passages 40.

Now, as shown in FIG. 5A and FIG. 5B, the fluid Fu flows through both the fluid passages 40 formed in the first plates 20A and the fluid passages 40 formed in the second plates 20B.

These flows of fluid Fu, Fu mix vigorously at the connecting parts 44 at the intersection positions. That is, the intersecting flows of fluid Fu, Fu create eddy currents (turbulent flow) in a fixed direction.

Next, the operation of the heat storing module 11 of the first preferred embodiment described above will be explained.

As shown in FIG. 5A and FIG. 5B, in the heat storing module 11, by the fluid passages 40 of one plate 20A intersecting roughly at right angles with the fluid passages 40 of the other plate 20B and connecting at these intersections, flows of fluid Fu, Fu flowing through these intersecting fluid passages 40, 40 can be made to mix together energetically at the intersection positions. That is, by the intersecting flows of fluid Fu, Fu it is possible to create eddy currents (eddy currents in mutually opposite directions) that whirl eddies in a roughly fixed direction in the fluid Fu.

Because as a result of the fluids Fu, Fu forming eddies the efficiency of heat exchange between the heat storing material Sh (see FIGS. 4A and 4B) and the fluid Fu increases, the heat transfer area can be reduced corresponddingly. Because the heat transfer area is lower, the heat storing device 10 can be made small and light.

Furthermore, because all that is being done is that eddy currents (mutually opposite eddy currents) swirling eddies in a fixed direction are created by flows of fluid Fu, Fu passing through mutually intersecting fluid passages 40, 40 being made to mix energetically at the intersection positions, pressure loss in the fluid Fu can be kept down. Therefore, it is possible to provide a high-performance heat storing device 10 with increased heat exchange efficiency and low pressure loss of the fluid Fu.

Also, the fluid Fu can be made to form eddy currents easily by means of the simple construction of just connecting the mutually intersecting fluid passages 40, 40 at the positions where they intersect with each other. A heat storing device 10 with good heat exchange efficiency can be produced cheaply.

In this way it is possible to raise the efficiency of heat exchange between the heat storing material Sh and the fluid Fu while making the cost of the heat storing device 10 low.

In the heat storing module 11, because as shown in FIG. 2 and FIG. 3 the fluid passages 40 are made to intersect and connect at a fixed pitch, eddy currents can be created in the fluid Fu flowing through the fluid passages 40 at intervals of the fixed pitch. And because the eddy currents are created at many locations, the efficiency of heat exchange between the heat storing material Sh (see FIG. 4B) and the fluid Fu can be raised all the more.

Also, in the heat storing module 11, because the fluid inlet header 60 is made to front onto the multiple plates 20, that is, the two sides on either side of one angle 25 of the quadrilateral (the first side 21 and the second side 22), as shown in FIG. 1, FIG. 6, FIG. 7 and FIG. 9, the first ends 42 of the mutually intersecting fluid passages 40 formed in the multiple plates 20 can be connected by the fluid inlet header 60. Consequently, fluid can be distributed from the one fluid inlet header 60 to the first ends 42 of all of the mutually intersecting fluid passages 40.

Because the fluid outlet header 70 is made to front onto the two sides other than these sides 21 and 22 (the third side 23 and the fourth side 24), the fluid outlet header 70 can connect to the second ends 43 of all of the mutually intersecting fluid passages 40. Consequently, the fluid Fu can be collected in the fluid outlet header 70 from the second ends 43 of the mutually intersecting fluid passages 40 and guided out by the one fluid outlet header 70.

In this way, only one each of the headers 60, 70 are needed to guide the fluid Fu in to and out of the multiple mutually intersecting fluid passages 40. Consequently, the number of parts is low and the heat storing device 10 can be made simple.

Next, a second preferred embodiment of a heat storing device according to the invention will be described, on the basis of FIG. 11 to FIG. 21. Parts the same as parts in the first preferred embodiment shown in FIG. 1 to FIG. 10 have been given the same reference numerals and will not be described again.

Figure 11:
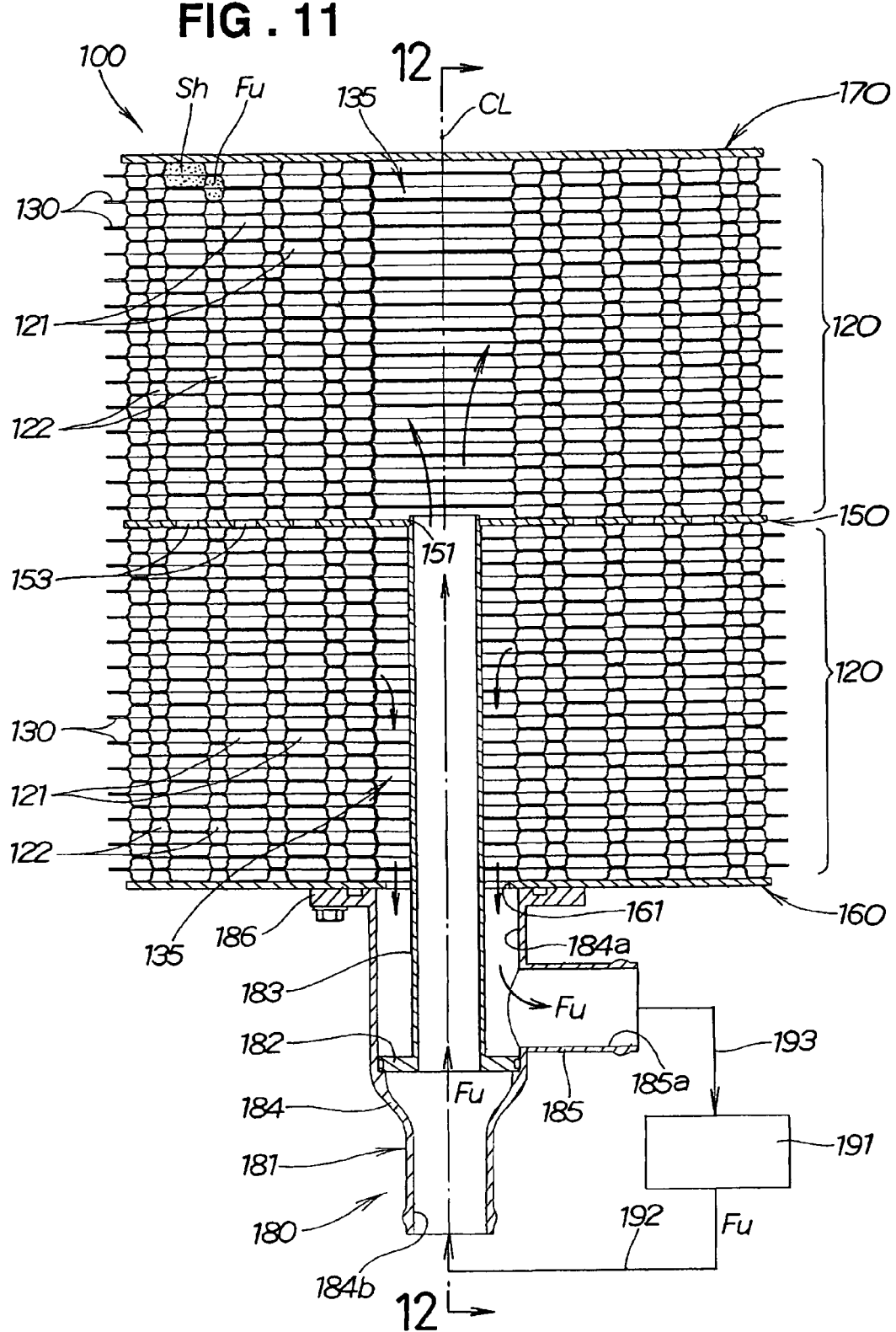
FIG. 11 is a sectional view on the centerline of a heat storing device according to a second preferred embodiment of the present invention.
Figure 12:
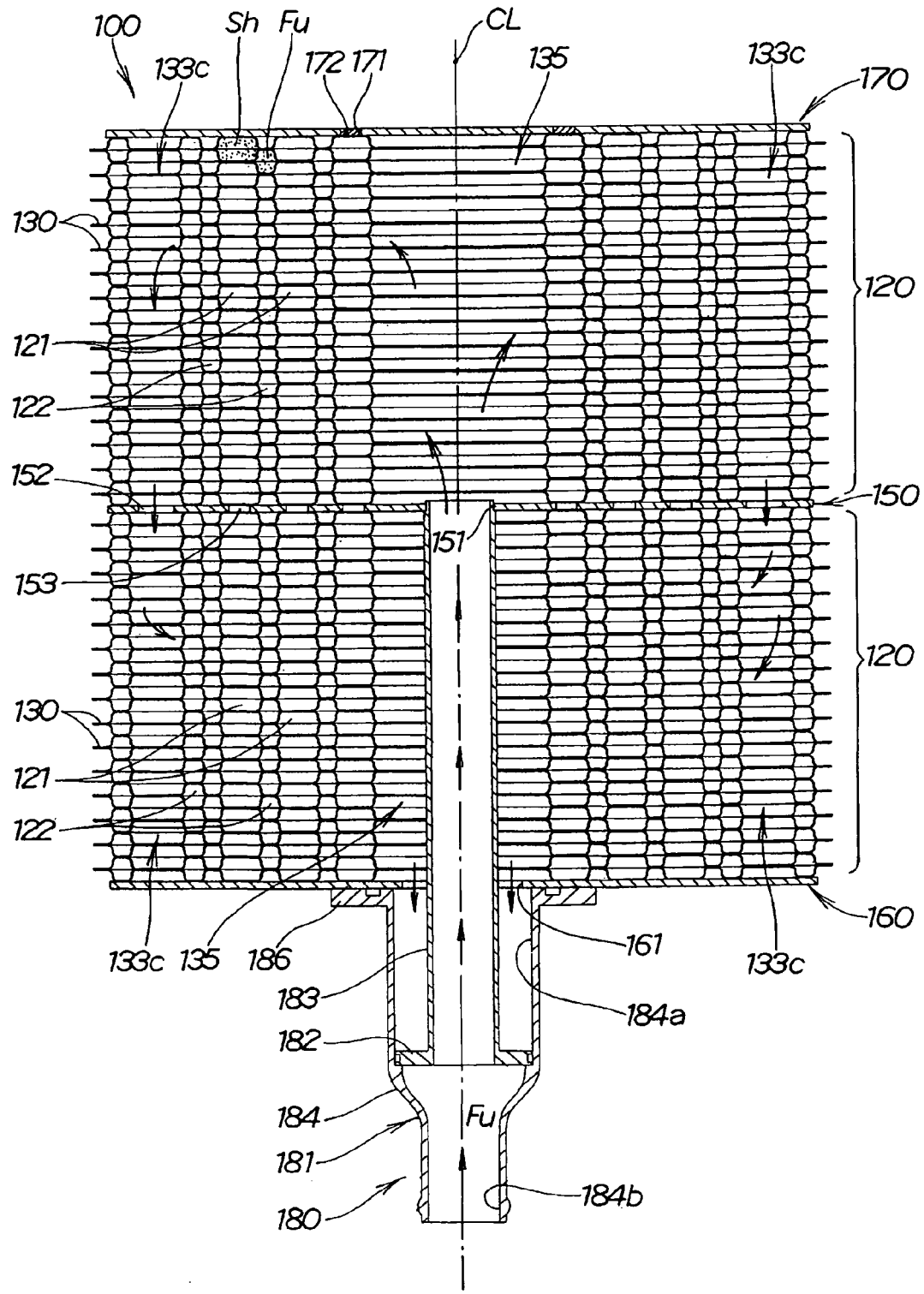
FIG. 12 is a sectional view taken along line 12-12 in FIG. 11.
Figure 13:
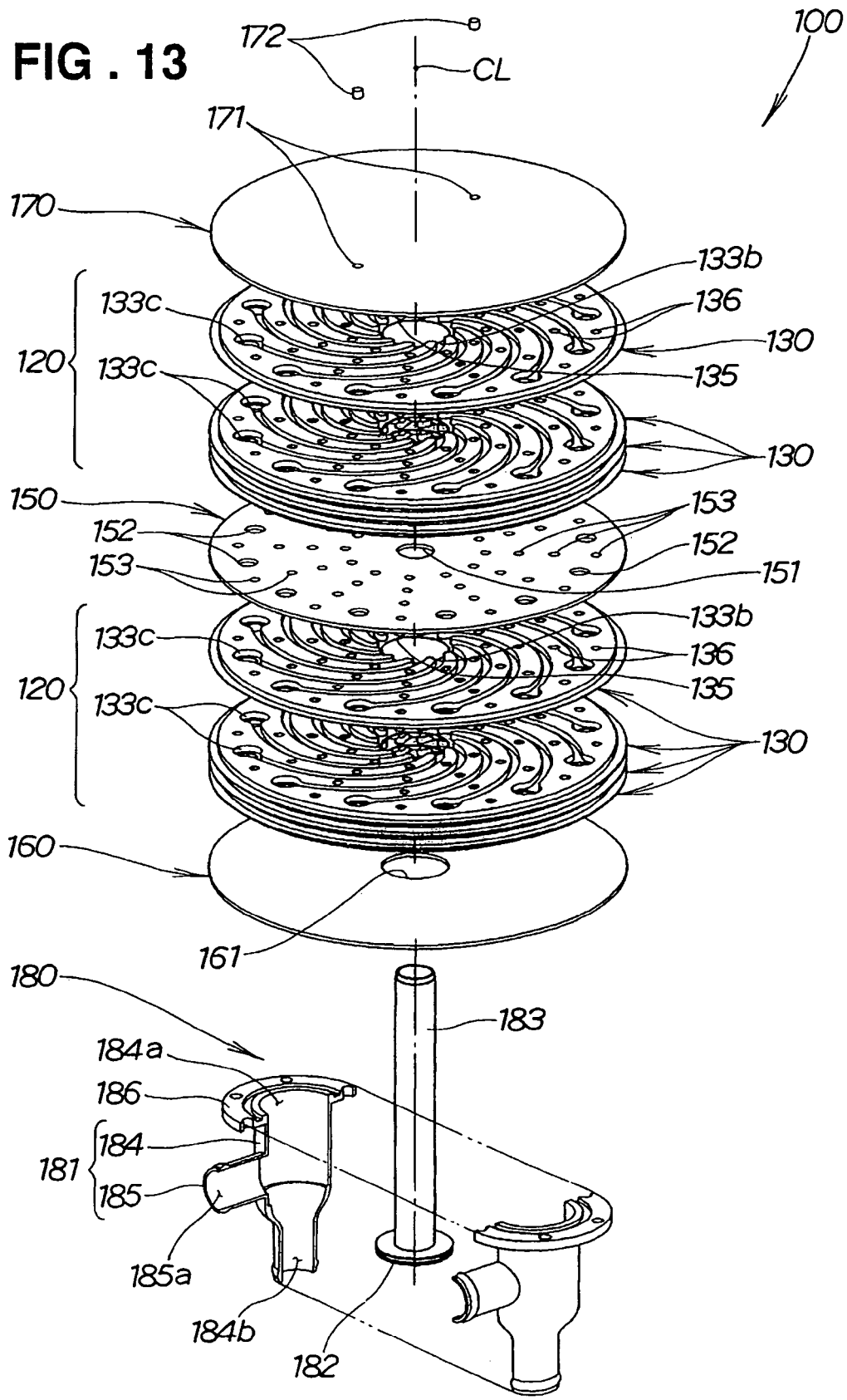
FIG. 13 is an exploded perspective view of the heat storing device shown in FIG. 11.

As shown in FIG. 11 to FIG. 13, the heat storing device 100 of this second preferred embodiment is made up of an even number of (for example two) heat storing modules 120, 120 in a vertical stack, a separator plate 150 interposed between the heat storing modules 120, 120, a bottom plate 160 covering the lower side of the lowermost heat storing module 120, and a top plate 170 covering the upper side of the uppermost heat storing module 120.

In the following, the lowermost storing module 120 will be called 'the lower heat storing module 120' and the uppermost storing module 120 will be called 'the upper heat storing module 120'.

The two upper and lower heat storing modules 120, 120 are parts having the same construction as each other, have an approximately cylindrical or square-prismatic shape and are stacked concentrically on a centerline CL. These heat storing modules 120 integrally have multiple heat storing material spaces 121 filled with a heat storing material Sh and multiple fluid passages 122 for a fluid Fu to pass through.

A connnector 180 disposed on the centerline CL of the heat storing modules 120, 120 is attached to the bottom plate 160. The connnector 180 includes integrally an inlet 184b and an outlet 185a for the fluid passages 122. In this way, the heat storing device 100 has a connnector 180 at one end (that is, on the bottom plate 160 or the top plate 170) of an even number of heat storing modules 120, 120. The details of the connnector 180 will be discussed later.

The upper and lower heat storing modules 120, 120 are each made up of multiple elements 130 in a stack. These elements 130 will be described now.

Figure 14:
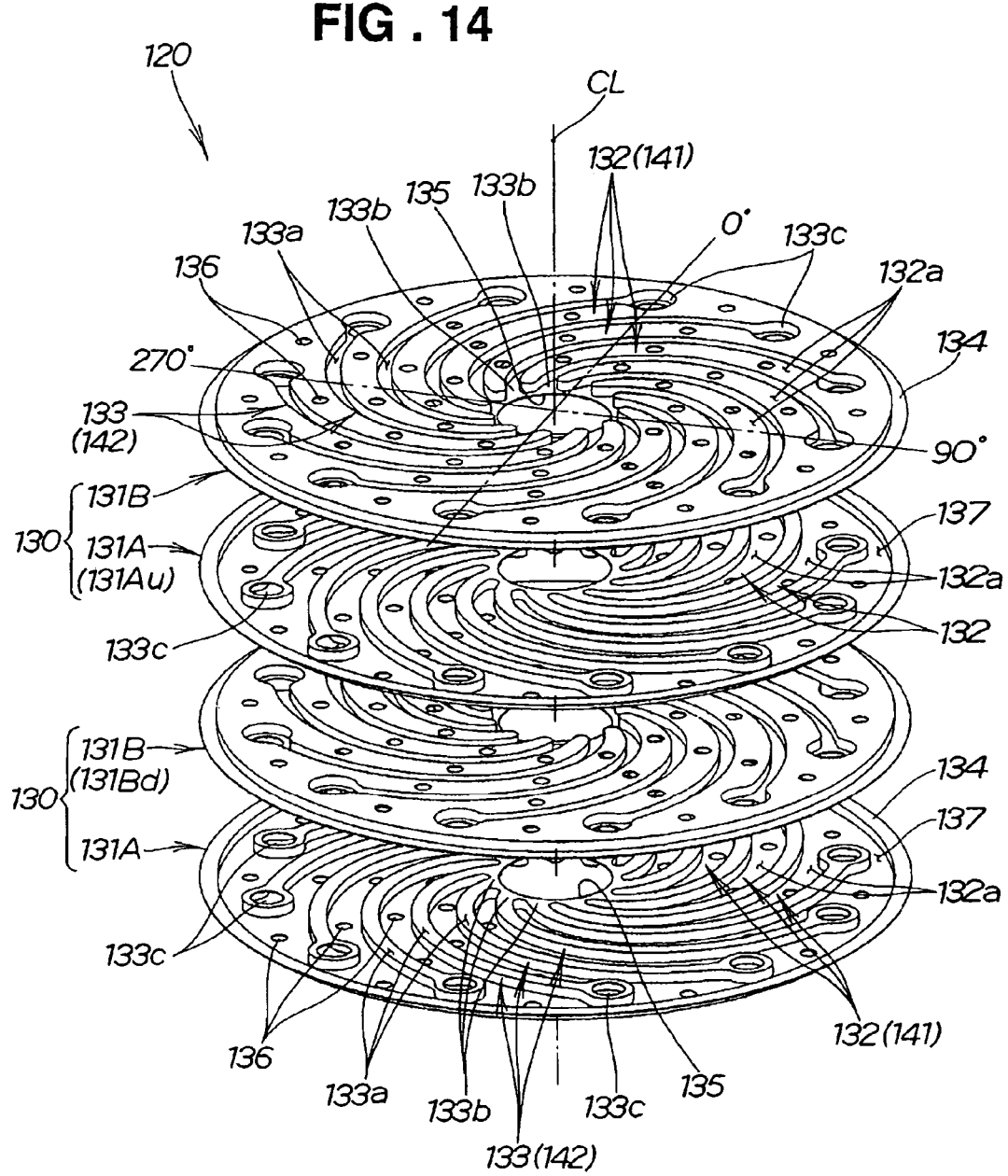
FIG. 14 is an exploded perspective view of two elements shown in FIG. 13.

As shown in FIG. 14, one element 130 is made up of a lower, first plate 131A and an upper, second plate 131B stacked upside-down against the first plate 131A. When the first and second plates 131A, 131B are stacked, multiple recesses 132 and multiple tongue parts 133 are brought face-to-face with each other. By the upper and lower tongue parts 133 and peripheral flanges 134 being joined together, the first and second plates 131A, 131B become integral.

By the first and second plates 131A, 131B brought face-to-face with each other being joined in a stack, one element 130 can be obtained.

The first and second plates 131A, 131B are flat, disc-shaped plates and each have one liquid flow hole 135 passing through their center on the vertical centerline CL of the heat storing module 120. These liquid flow holes 135 constitute a liquid flow hole 135 of the heat storing module 120. These first and second plates 131A, 131B are for example press-formings of metal plates made of aluminum alloy or the like.

Figure 15:
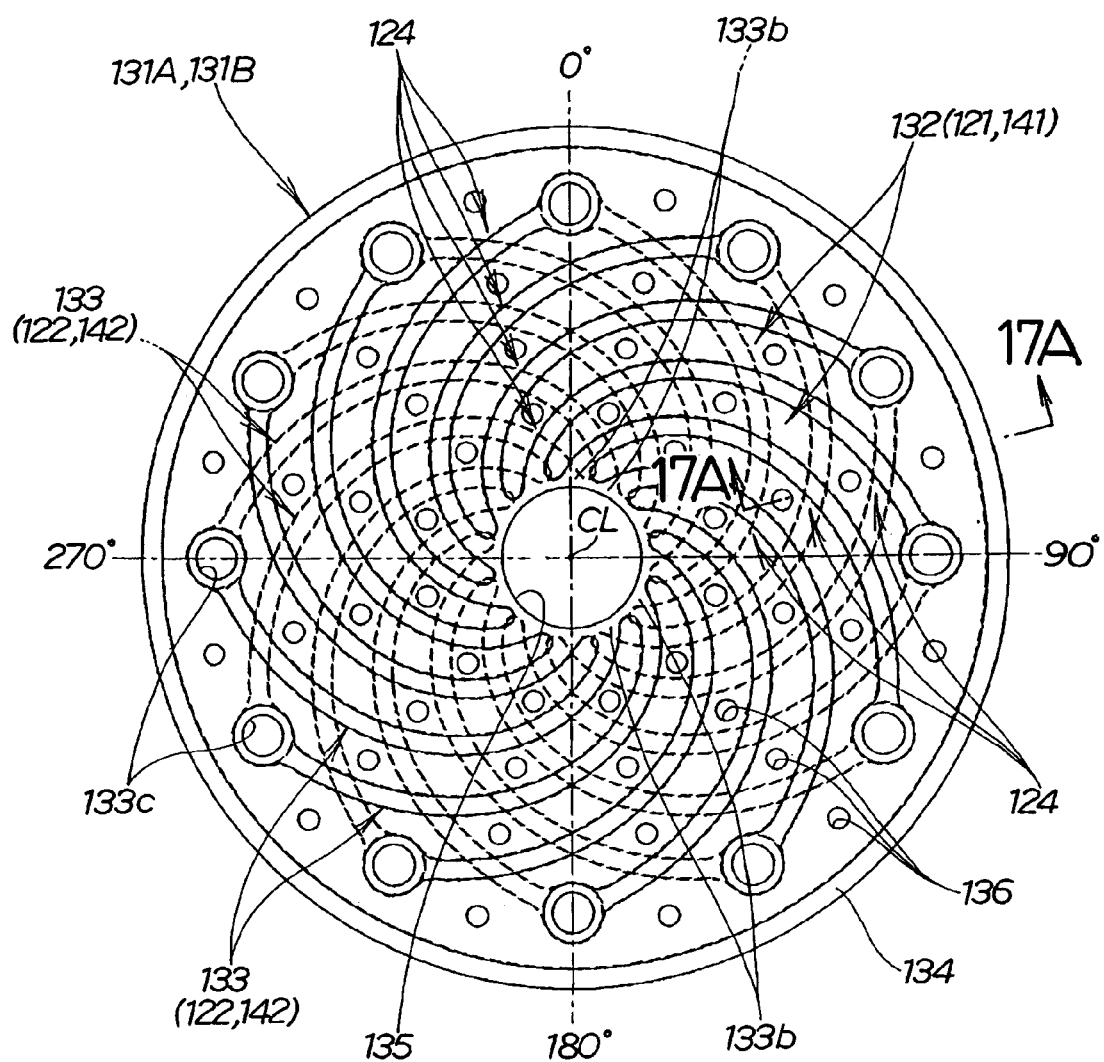
FIG. 15 is a plan view of one element shown in FIG. 14.
Figure 16B:
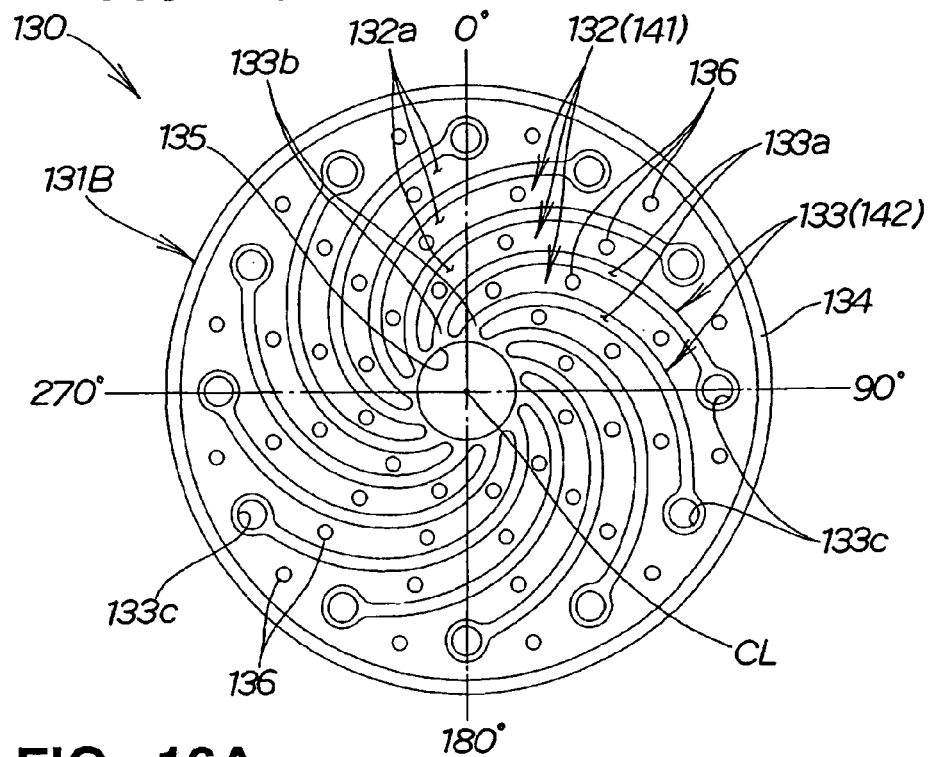
FIG. 16A and FIG. 16B are plan views of parts of the one element shown in FIG. 15.
Figure 16A:
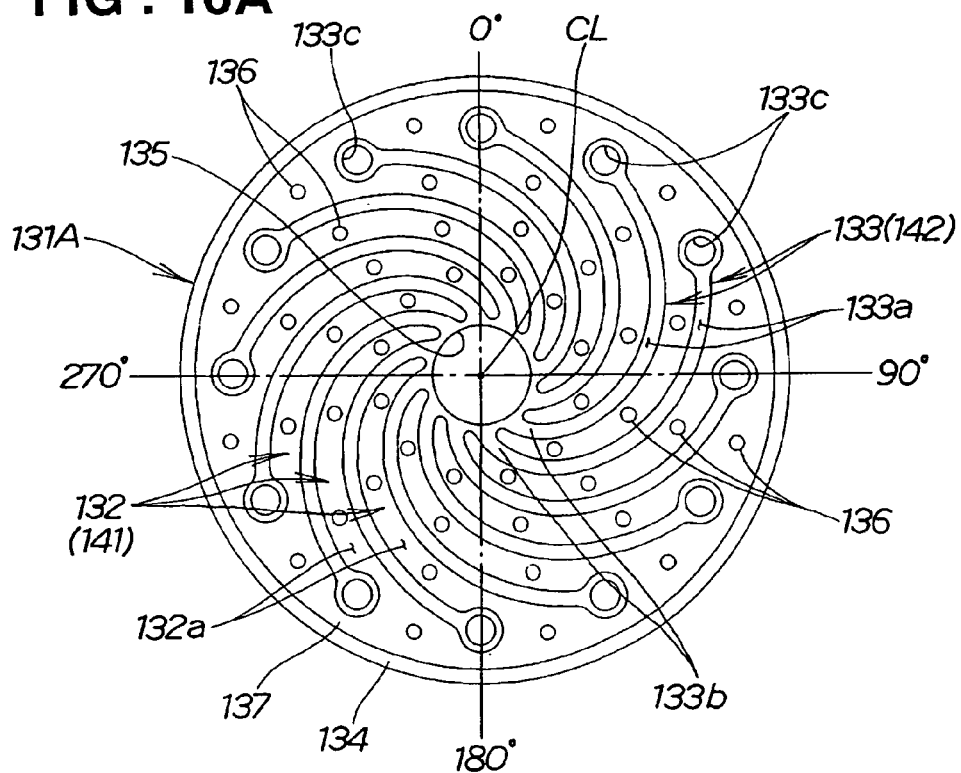

FIG. 14 and FIG. 15 show a lower, first plate 131A and an upper, second plate 131B brought together. FIG. 16A shows a first plate 131A seen from above. FIG. 16B shows a second plate 131B seen from above in association with FIG. 16A.

As shown in FIG. 14 to FIG. 16A, in the first plate 131A multiple (for example twelve) recesses 132 and multiple (for example twelve) tongue parts 133 are formed with a uniform pitch around the liquid flow hole 135 with the center CL as a reference, in the shape of a counter-clockwise spiral (swirling out to the left as seen from above).

The spiral shape of the recesses 132 and the tongue parts 133 is an involute curve. Because they are involute curves, they can be made a spiral shape with roughly the same spacing at any swirl part.

In this first plate 131A, the arrangement of the recesses 132 and the tongue parts 133 is as follows.

The swirl starting ends of the recesses 132 are arranged with a uniform pitch in the proximity of the liquid flow hole 135. The swirl terminating ends of the recesses 132 are arranged at the periphery of the first plate 131A and are connected to each other by an annular recess 137. The spiral angle of the recesses 132 from their inner ends to their outer ends is about 105°.

The swirl starting ends 133b, or inner ends 133b, of the tongue parts 133 are arranged with a uniform pitch in the proximity of the liquid flow hole 135. The swirl terminating ends 133c, or outer ends 133c, of the tongue parts 133 are arranged around the periphery of the first plate 131A. The spiral angle of the tongue parts 133 from their inner ends 133b to their outer ends 133c is about 120°. The outer ends 133c have circular holes passing through the plate. The twelve outer ends 133c are arranged with a pitch of 30° with reference to a position of orientation 0°.

As described above, the upper, second plate 131B is a member which assumes the same shape as the first plate 131A when turned upside-down with respect to the first plate 131A. That is, the second plate 131B is a member exactly the same as the first plate 131A disposed upside-down.

In the second plate 131B, multiple (for example twelve) recesses 132 and tongue parts 133 are formed around the liquid flow hole 135 with the centerline CL as a reference, in the shape of a clockwise spiral (swirling out to the right as seen from above).

Accordingly, with respect to the spiral direction of the recesses 132 and the tongue parts 133 in the first plate 131A, the spiral direction of the recesses 132 and the tongue parts 133 in the second plate 131B is opposite.

Next, one element 130 will be described, on the basis of FIG. 17A and FIG. 17B. FIG. 17A shows an element 130 in a cross-section on the line 17A-17A in FIG. 15, and is an exploded view. FIG. 17B shows the element 130 with its first and second plates 131A, 131B stacked together.

As shown in FIG. 17A, the lower, first plate 131A is a member in which are formed integrally recesses 132 sunk downward from a horizontal upper-side plate face 131a (a plate face 131a facing a second plate 131B), tongue parts 133 having tongue faces 133a (bottoms 133a) coplanar with the plate face 131a, a peripheral flange 134 coplanar with the plate face 131a, and an annular recess 137 sunk downward from the plate face 131a.

The recesses 132 and the tongue parts 133 are arranged alternately in the radial direction (the left-right direction in FIG. 17A) of the first plate 131A and are approximately right-angled quadrilaterals in cross-sectional shape. The bottoms 132a of the recesses 132, the tongue faces 133a of the tongue parts 133, and the flanges 134 are flat faces parallel with the plate face 131a of the first plate 131A. The bottoms 132a of the recesses 132 and the bottom 137a of the annular recess 137 have heat storing material flow holes 136 passing through them vertically (that is, in the plate thickness direction). The heat storing material flow holes 136 constitute heat storing material flow holes 136 of the heat storing modules 120 (see FIG. 14).

When the second plate 131B is brought together with the first plate 131A, the recesses 132 and the tongue parts 133 are brought together. FIG. 17B shows the tongue faces 133*a*, 133*a* of the tongue parts 133, 133 brought together.

In this state, the flanges 134, 134 at the outer circumferential parts of the first, second plates 131A, 131B are stacked with each other.

By the tongue faces 133*a*, 133*a* of the tongue parts 133, 133 and the flanges 134, 134 being joined together in this state, one element 130 can be constructed. The joining may be done for example by welding, brazing or bonding.

By this construction being adopted, the recesses 132 of the first plate 131A become spaces divided by the plate face 131*a* of the second plate 131B. The recesses 132 of the second plate 131B become spaces divided by the plate face 131*a* of the first plate 131A. These spiral-shaped recesses 132, 132 form heat storing material spaces 121, 121.

Now, naturally, when the external shape of the element 130 as a whole is seen, as shown in FIG. 17B, with respect to when the first and second plates 131A, 131B are each viewed alone, the recesses and tongues are inverted. That is, the rear-side parts 141 of the recesses 132 in the first and second plates 131A, 131B are projecting and the rear-side parts 142 of the tongue parts 133 in the first and second plates 131A, 131B are sunk.

It can be said that the rear-side parts 141 of the recesses 132 are tongue parts 141 in the element 130 (hereinafter called 'the element tongue parts 141'). And it can be said that the rear-side parts 142 of the tongue parts 133 are recesses 142 in the element 130 (hereinafter called 'the element recesses 142').

Figure 18:
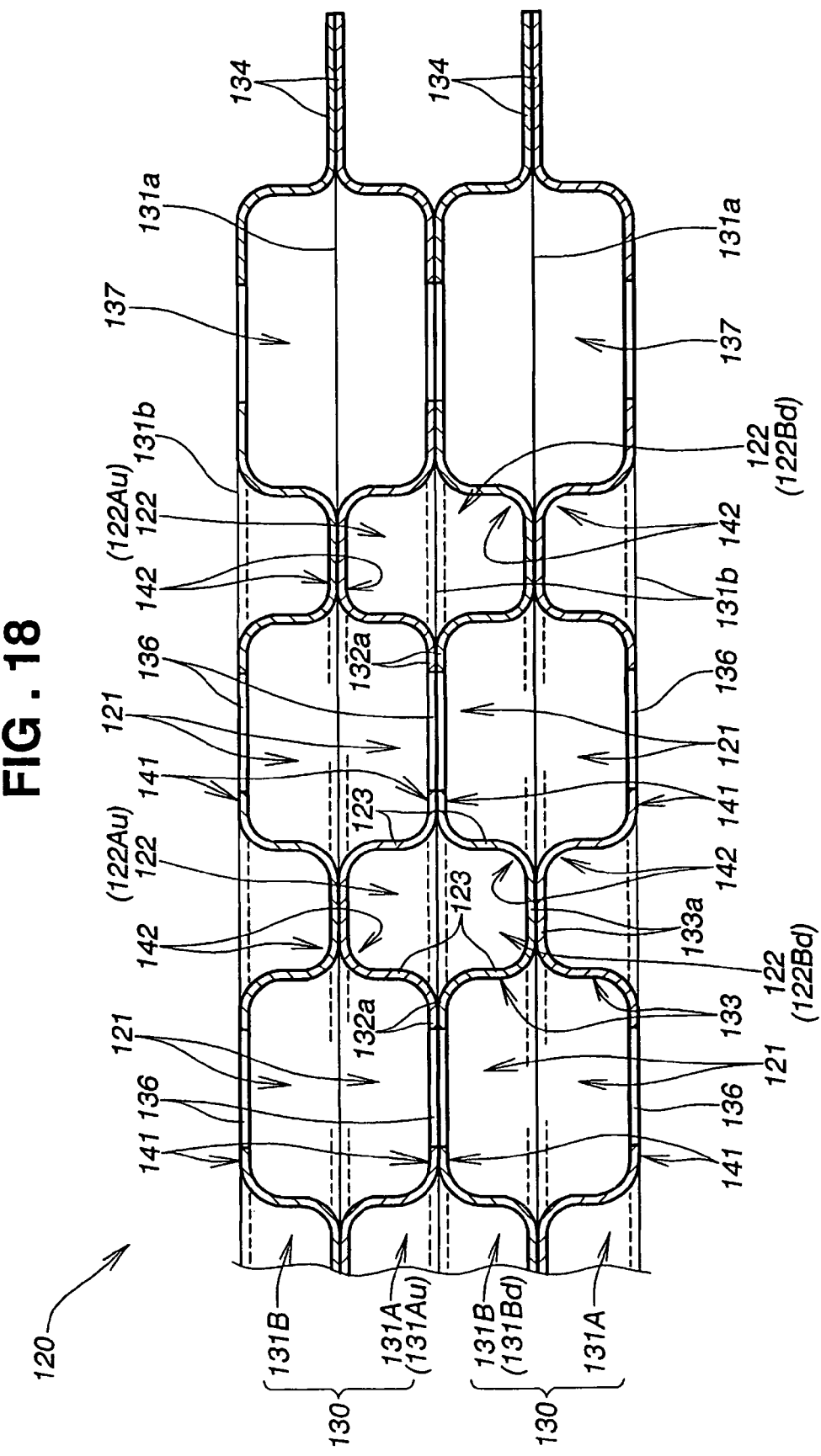
FIG. 18 is a sectional view of two of the element shown in FIG. 17A and FIG. 17B stacked together.

In the state shown in FIG. 18, the element tongue parts 141, 141 and the element recesses 142, 142 have been brought to face each other. By multiple elements 130, 130 being stacked, and the tongue facing each other in the tongue parts 141, 141 of the element (that is, the bottoms 132*a*, 132*a* of the recesses 132, 132) being joined together, a heat storing module 120 can be constructed. The joining may be done for example by welding, brazing or bonding.

Here, of the upper/lower two elements 130, 130, the first plate 131A of the upper element 130 will for convenience be renamed 'the first plate 131Au', and the second plate 131B of the lower element 130 will for convenience be renamed 'the second plate 131Bd'. Naturally, the first plate 131Au and the second plate 131Bd are a pair of mutually adjacent plates.

By this construction being adopted, the recesses 142 (element recesses 142) in the first plate 131Au become spaces divided by a plate face 131*b* of the second plate 131Bd. And the recesses 142 in the second plate 131Bd become spaces divided by the plate face 131*b* of the first plate 131Au. The spiral recesses 142, 142 in these plates 131Au, 131Bd constitute fluid passages 122, 122. These recesses 142, 142 constitute recesses in the element.

Of multiple plates 131A, 131B, 131A, 131B, each mutually adjacent pair of plates 131Au, 131Bd is stacked so that the faces (plate faces) 131*b*, 131*b* having the fluid passages 122 in them are facing each other.

The fluid passages 122 are adjacent to the heat storing material spaces 121 and are narrower than the heat storing material spaces 121. The heat storing material spaces 121 and the fluid passages 122 are divided from each other by walls 123 and are thus mutually non-connecting. These walls 123 double as heat transfer plates for exchanging heat between the heat storing material spaces 121 and the fluid passages 122. The thickness of the walls 123 is one sheet thickness of the first and second plates 131A, 131B and is thus extremely thin.

As shown in FIG. 17A, in the first and second plates 131A, 131B, the recesses 132 and the tongue parts 133 are arranged alternately in the radial direction (the left-right direction of the paper). Consequently, as shown in FIG. 18, the heat storing material spaces 121 and the fluid passages 122 are arrayed in a zig-zag shape in side view and alternately.

Here, the overall construction of the first and second plates 131A, 131B will be explained in detail. As shown in FIG. 14, when the upper, second plate 131B is seen from the opposite side of it from the first plate 131A (i.e. from its rear side), the element recesses 142 are connected to the liquid flow hole 135. This is also true of the lower, first plate 131A. Thus, the inner ends of the fluid passages 122 formed by the element recesses 142 (see FIG. 18) connect with the liquid flow hole 135.

From now on, the inner ends 133*b* of the tongue parts 133 will be called the inner ends 133*b* of the fluid passages 122. Similarly, the outer ends 133*c* of the tongue parts 133 will be called the outer ends 133*c* of the fluid passages 122. The fluid passages 122 are multiple layers of spiral spaces with the center CL of the heat storing module 120 as a reference. The same is true of the heat storing material spaces 121 shown in FIG. 17B. As shown in FIG. 15, the multiple heat storing material spaces 121 and the multiple fluid passages 122 are arrayed around the center CL of the heat storing module 120, alternating one by one with a uniform pitch.

As shown in FIG. 14, the elements 130 can be manufactured by forming the spiral tongues and recesses in the first and second plates 131A, 131B by press-forming and then stacking these first and second plates 131A, 131B together. And by stacking and joining together multiple (for example fourteen) elements 130, it is possible to construct a heat storing module 120 easily.

Moreover, because it is simply a matter of forming tongues and recesses in plates, the passage width of the fluid passages 122 (see FIG. 18) can be made narrow, easily and at a low cost. And, as mentioned above, the thickness of the walls 123 between the heat storing material spaces 121 and the fluid passages 122 (see FIG. 18) is extremely thin.

Because the passage width can be made narrow and the walls 123 between the passages can be made thin, the heat exchange efficiency with which heat energy is exchanged between the heat storing material Sh (see FIG. 11) in the heat storing material spaces 121 and the fluid Fu (see FIG. 11) flowing through the fluid passages 122 can be raised further. And because the walls 123 can be made thin, the heat storing device 100 (see FIG. 11) can be made small and light.

Furthermore, because they are spiral-shaped, a sufficient heat transfer area between the heat storing material spaces 121 and the fluid passages 122 can be provided in a small heat storing module 120. Accordingly, the heat storing device 100 can be made small.

Also, because the walls 123 between the passages consist of just one plate, they are of a uniform thickness. As a result, the exchange of heat energy between the heat storing material Sh in the heat storing material spaces 121 and the fluid Fu flowing through the fluid passages 122 can be carried out uniformly, and the heat exchange efficiency can be raised still further.

As shown in FIG. 15, FIG. 18, FIG. 19A and FIG. 19B (a sectional view on the line 19B-19B in FIG. 19A), the fluid passages 122 formed in the first plate 131Au are narrow, long channels with the lower sides open. And the fluid passages 122 in the second plate 131Bd are narrow, long channels with their upper sides open. Consequently, upper/lower pairs of fluid passages 122, 122 connect at positions where they intersect with each other. That is, upper/lower pairs of fluid passages 122, 122 have connecting parts 124 where they connect with each other.

Figure 19A:
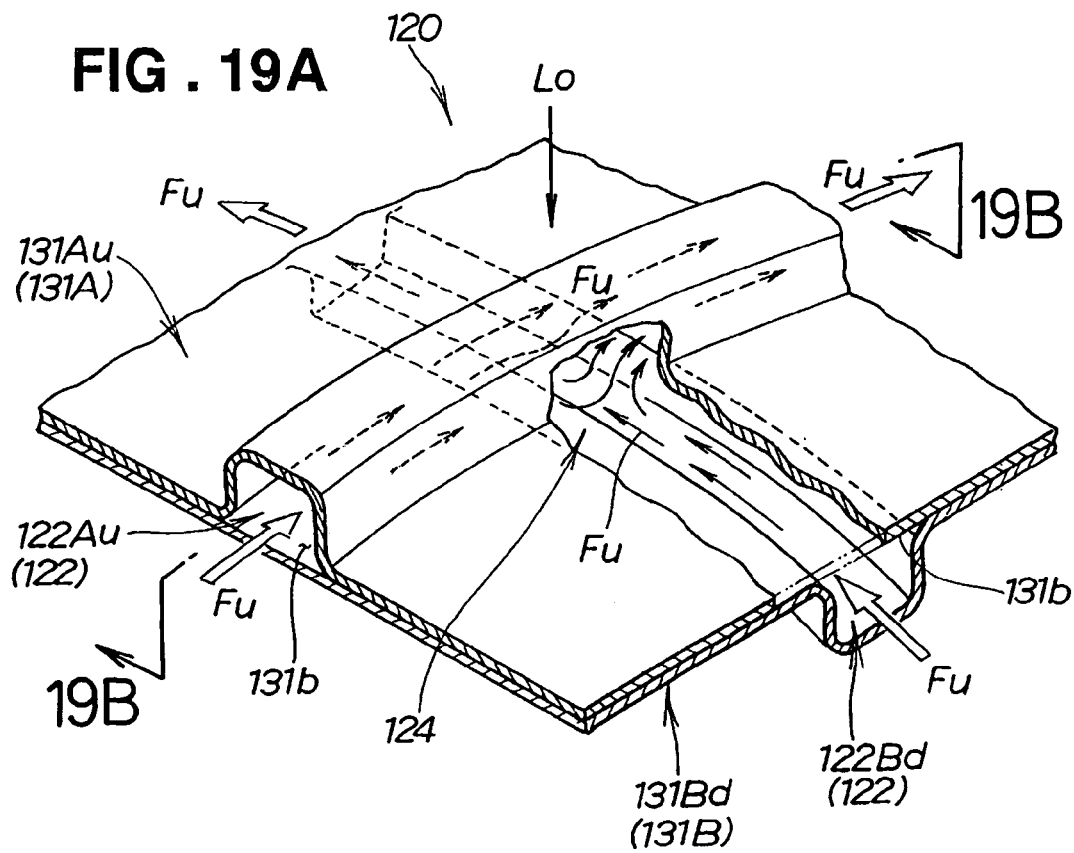
FIG. 19A and FIG. 19B are views of the upper/lower pair of plates shown in FIG. 18 stacked and forming intersecting fluid passages.
Figure 19B:
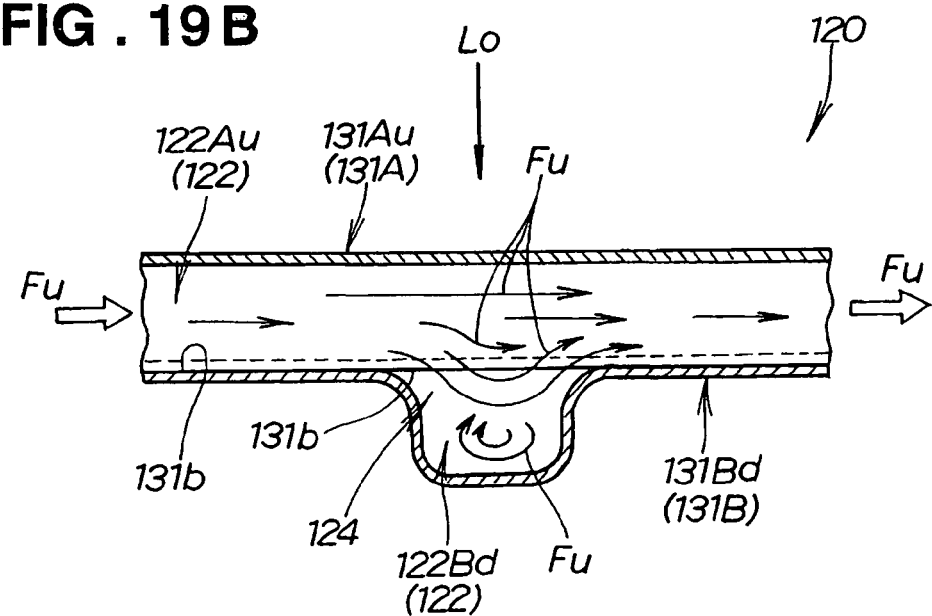
Figure 24A:
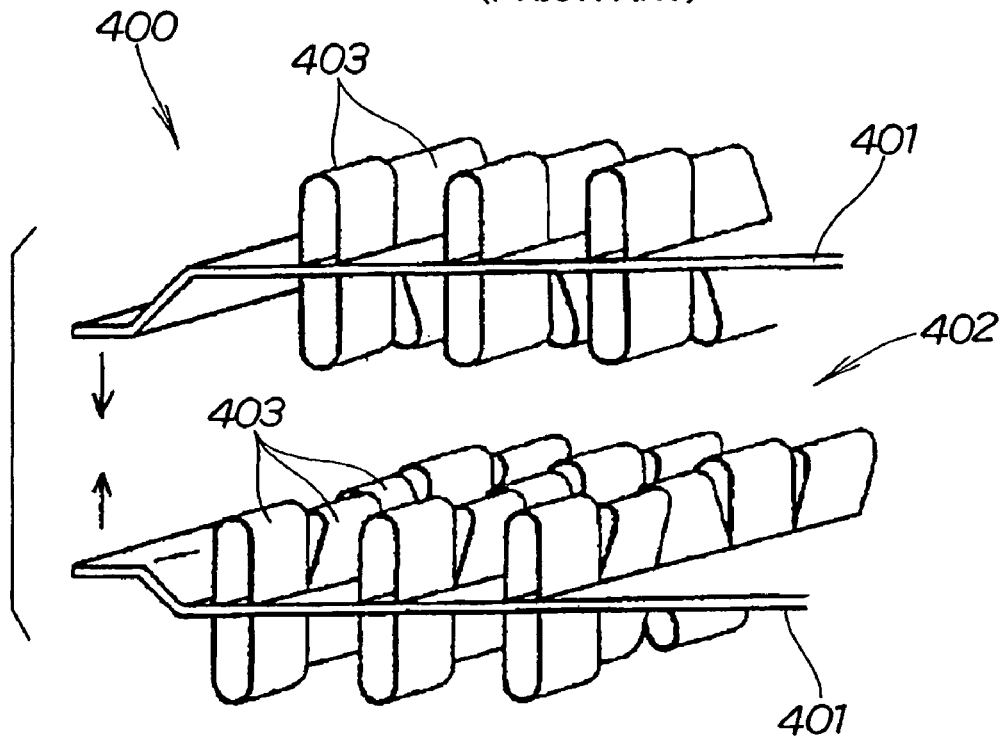
FIG. 24A and FIG. 24B are schematic views of a heat exchanger of related art.
Figure 24B:
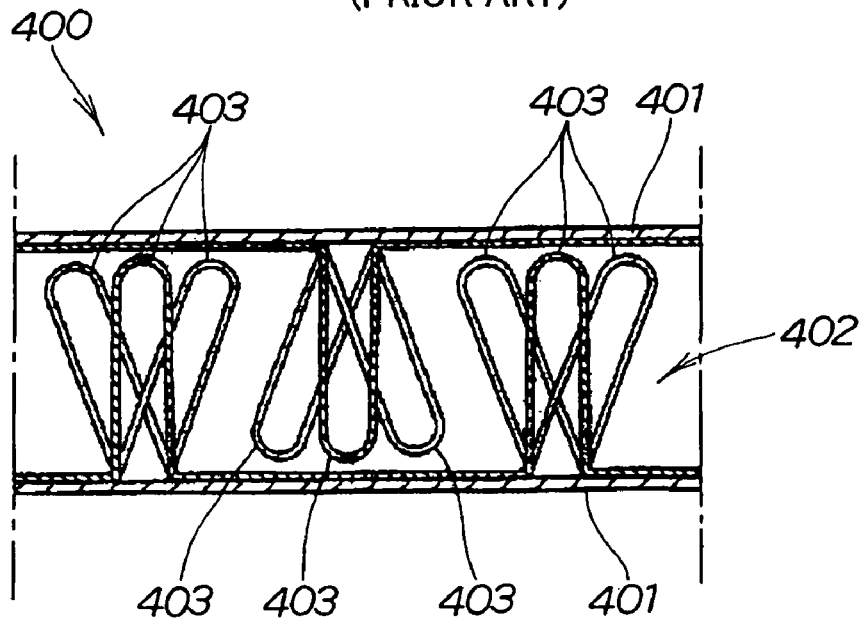

As shown in FIG. 15 and FIG. 19A and FIG. 19B, when the multiple plates 131Au, 131Bd are seen face-on (in the direction of the arrow Lo in FIG. 19A and FIG. 19B), the fluid passages 122, 122 with mutually opposite spirals intersect roughly at right angles at the positions where they intersect.

Next, the other parts of the heat storing device 100 of this second preferred embodiment will be explained, on the basis of FIG. 11 and FIG. 13.

The bottom plate 160 is a flat plate with its peripheral shape matched to that of the lower heat storing module 120, and has one fluid outlet 161 at the center CL. The fluid outlet 161 is a circular through hole.

The separator plate 150 is a flat plate with its peripheral shape matched to that of the lower heat storing module 120, and has one first intermediate connecting hole 151 provided at the center CL, multiple second intermediate connecting holes 152 provided near its periphery, and multiple third intermediate connecting holes 153 provided in the middle.

The second intermediate connecting holes 152 are through holes aligned with the positions of the outer ends 133c, 133c of the fluid passages 122, 122 in the upper and lower heat storing modules 120, 120 (see FIG. 11) and spaced with a uniform pitch around the center CL. These second intermediate connecting holes 152 perform the role of connecting together the outer ends 133c, 133c of the fluid passages 122, 122 of the upper/lower adjacent heat storing modules 120, 120 (see also FIG. 12).

The multiple third intermediate connecting holes 153 are through holes aligned with the positions of the heat storing material flow holes 136 in the upper and lower heat storing material spaces 121, 121 (see FIG. 1). These third intermediate connecting holes 153 perform the role of connecting together upper/lower heat storing material spaces 121, 121 of the upper/lower adjacent heat storing modules 120, 120.

As shown in FIG. 12 and FIG. 13, the top plate 170 is a flat plate with its peripheral shape matched to that of the uppermost heat storing module 120, and has a plurality of filling holes 171.

The filling holes 171 are through holes aligned with the positions of heat storing material flow holes 136 in the heat storing modules 120. All of the heat storing material spaces 121 are filled with the heat storing material Sh through one of the filling holes 171, and then the filling holes 171 are closed with plugs 172.

The separator plate 150, the bottom plate 160 and the top plate 170 are metal parts made of for example aluminum alloy or are resin moldings or the like.

The contacting faces of the upper and lower heat storing modules 120, 120, the separator plate 150, the bottom plate 160 and the top plate 170 can be sealed and assembled integrally to each other by brazing, welding or bonding or the like. They may be sealed by the insertion of packings.

As shown in FIG. 11 and FIG. 13, the connnector 180 is made up of a T-shaped pipe 181, a partition plate 182 and a connecting pipe 183. To facilitate understanding, in FIG. 13 the T-shaped pipe 181 is shown cut into left and right halves.

The T-shaped pipe 181 is a T-shaped joint made up of a vertically long straight pipe part 184 and a branch part 185 extending sideways from part-way up the straight pipe part 184.

The straight pipe part 184 consists of a large-diameter pipe having a first opening 184a and a second opening 184b. The second opening 184b is of smaller diameter than the other parts. Also, the straight pipe part 184 has a flange 186 at the first opening 184a. The flange 186 is attached to one end of the lowermost heat storing module 120.

In this way, the first opening 184a part of the straight pipe part 184 is a connection opening for being attached to one end of the lowermost heat storing module 120 and connecting with the fluid outlet 161. The first opening 184a part of the straight pipe part 184 will from now on be called 'the module connection opening 184a'. The internal diameter of the module connection opening 184a is roughly the same as the diameter of the liquid flow hole 135 of the heat storing module 120.

By the flange 186 being fixed to the bottom plate 160 with bolts, the connnector 180 can be attached to the bottom face of the lowermost heat storing module 120. As a result, the module connection opening 184a connects with the fluid outlet 161. The second opening 184b will from now on be called 'the inlet 184b'.

The branch part 185 consists of small-diameter pipe branched from the straight pipe part 184. The opening 185a of the branch part 185 will from now on be called 'the outlet 185a'.

The partition plate 182 is a disc that fits in the middle of the straight pipe part 184 and partitions the straight pipe part 184 part-way along its length direction. By the inside of the straight pipe part 184 being partitioned, the inlet 184b can be partitioned from the module connection opening 184a and the outlet 185a. The outlet 185a remains connected to the module connection opening 184a.

This partition plate 182 has a connecting pipe 183 connecting to the inlet 184b inside the straight pipe part 184. More specifically, the connecting pipe 183 is a small-diameter pipe extending from the partition plate 182 to the module connection opening 184a side, parallel with the straight pipe part 184.

One end of the connecting pipe 183 is connected to the inlet 184b. The other end of the connecting pipe 183 projects above the module connection opening 184a into the heat storing module 120, and the projecting end is fitted in the first intermediate connecting hole 151 of the separator plate 150. Thus, the inlet 184b is connected to the liquid flow hole 135 in the uppermost heat storing module 120 by the connecting pipe 183.

As shown in FIG. 11, the inlet 184b and the outlet 185a in the connnector 180 are connected for example to a water-cooling jacket of an engine 191 by hoses 192, 193.

Next, an operation of the heat storing device 100 of the second preferred embodiment will be explained, with reference to FIG. 11, FIG. 12 and FIG. 19A to FIG. 21.

First, as shown in FIG. 21, hot fluid Fu having cooled the engine 191 enters the inlet 184b from the water-cooling jacket via the hose 192, passes through the connecting pipe 183 and flows into the liquid flow hole 135 of the upper heat storing module 120.

Then, as shown in FIG. 12 and FIG. 20, the fluid Fu enters all of the inner ends 133b (see FIG. 20) in the upper heat storing module 120 and flows to the outer ends 133c, moving radially outward in spirals in the fluid passages 122.

The fluid Fu then flows from the outer ends 133c in the upper heat storing module 120 through the second intermediate connecting holes 152 in the separator plate 150 (see FIG. 12) to the outer ends 133c in the lower heat storing module 120.

Then, as shown in FIG. 12 and FIG. 21, the fluid Fu moves radially inward in spirals through all of the fluid passages 122 in the lower heat storing module 120 and flows through the inner ends 133b (see FIG. 21) to the liquid flow hole 135.

Figure 10:
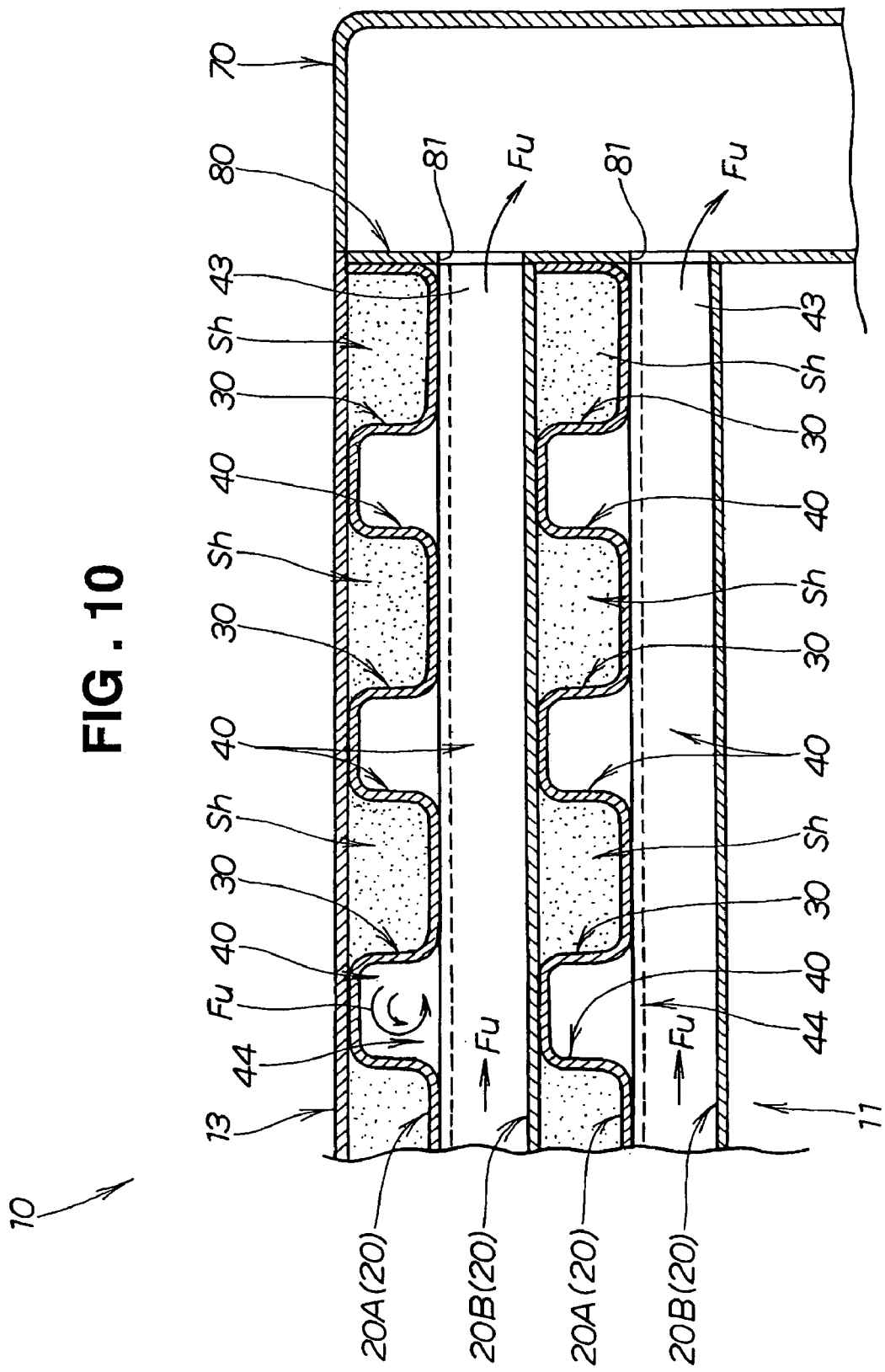
FIG. 10 is a detail view of the heat storing device shown in FIG. 7.

Then, as shown in FIG. 10, the fluid Fu goes from the liquid flow hole 135 through the fluid outlet 161 and the outlet 185a and returns from the outlet 185a to the water-cooling jacket of the engine 191 via the hose 193.

In this way, in the upper and lower heat storing modules 120, 120, heat can be exchanged between the heat storing material Sh in the heat storing material spaces 121 and the fluid Fu flowing through the fluid passages 122.

As shown in FIG. 19A and FIG. 19B, the fluid passages 122 formed in the first plate 131Au will be called 'the first fluid passages 122Au'. And the fluid passages 122 formed in the second plate 131Bd will be called 'the second fluid passages 122Bd'. The fluid Fu flows through both the first fluid passages 122Au and the second fluid passages 122Bd. These flows of fluid Fu mix energetically through the connecting parts 124 at the positions of the intersections. That is, the intersecting flows of fluid Fu, Fu create eddies (turbulence) of a fixed direction in the fluid Fu, Fu.

Next, the operation of a heat storing module 120 of the second preferred embodiment will be described.

As shown in FIG. 19A and FIG. 19B, in a heat storing module 120, by the second fluid passages 122Bd of the second plate 131Bd intersecting roughly at right angles with the fluid passages 122Au in the first plate 131Au and connecting with them at these intersection positions, flows of fluid Fu, Fu flowing in fluid channels 122 Au, 122Bd which are reversed from each other can be made to mix energetically at the intersection positions. That is, by means of mutually intersecting flows of fluid Fu, Fu, eddy currents (mutually opposite eddy currents) swirling eddies in a roughly fixed direction can be created in the fluid flows Fu, Fu.

Because of the flows of fluid Fu, Fu forming eddy currents and the heat exchange efficiency between the heat storing material Sh (see FIG. 11), the fluid Fu is increased, and the heat transfer area can be reduced by a corresponding amount. And because the heat transfer area is lower, the heat storing device 100 can be made smaller and lighter.

Furthermore, because all that is being done is that flows of fluid Fu, Fu flowing through mutually oppositely spiraling fluid passages 122Au, 122Bd are being made to mix energetically at the intersection positions and create eddy currents swirling eddies in a fixed direction, pressure loss of the fluid Fu can be kept down. Therefore, it is possible to provide a high-performance heat storing device 100 with increased heat exchange efficiency and low pressure loss of the fluid Fu.

Also, the fluid Fu can be made to form eddy currents easily by means of the simple construction of just connecting mutually oppositely spiraling fluid passages 122Au, 122Bd at the positions where they intersect with each other. A heat storing device 100 with good heat exchange efficiency can be produced cheaply.

In this way it is possible to raise the efficiency of heat exchange between the heat storing material Sh and the fluid Fu while making the cost of the heat storing device 100 low.

Also, because of the pair of plates 131Au, 131Bd in the heat storing module 120, when the second 131Bd is turned upside-down, it becomes the same shape as the first plate 131Au. By the second plate 131Bd being disposed upside-down with respect to the first plate 131Au, the spiral directions of the fluid passages 122Au, 122Bd can be made opposite. This makes it possible to use the first plate 131Au and the second plate 131Bd commonly, and it is only necessary to prepare one plate. Consequently, it is possible to keep down the variety of members constituting the heat storing device 100, and as a result it is possible to lower its manufacturing cost.

Also, in the heat storing module 120, because when the multiple plates 131A, 131B are seen from face-on the mutually oppositely spiraling fluid passages 122Au, 122Bd intersect roughly at right angles at the positions where they intersect, it is easy to create eddy currents swirling in a fixed direction.

In this invention, the heat storing devices 10, 100 may be disposed in any orientation. Their up-down and left-right orientation can be determined freely in accordance with the application of the heat storing device 10 and the layout of other devices.

The heat storing device 100 is not limited to a construction in which the even number of heat storing modules 120, 120 are stacked vertically, and for example they may alternatively be stacked horizontally.

The heat storing modules 11, 120 may alternatively be resin moldings.

In the first preferred embodiment, there may alternatively be multiple heat storing modules 11. In the second preferred embodiment, it is only necessary that there be an even number of heat storing modules, and alternatively there may be for example, four of the heat storing modules 120.

The joining together of the first and second plates 20A, 20B and the joining of the bottom plate 12 and the top plate 13 to the heat storing module 11 in the first preferred embodiment may alternatively be carried out by brazing by constituting the plates with brazing sheets. The joining together of the first and second plates 131A, 131B, the joining together of the elements 130, 130 and the joining of the separator plate 150, the bottom plate 160 and the top plate 170 to the heat storing modules 120 in the second preferred embodiment can also be carried out by brazing by constituting the plates with brazing sheets. A brazing sheet is a plate made by cladding one or both sides of a base material with brazing solder by rolling or the like.

Because the heat storing devices 10, 100 of this invention are devices for exchanging heat energy between a heat storing material Sh and a heat exchange fluid Fu, they are ideal as devices used for recovering waste heat from an engine 91, 191 and utilizing this recovered waste heat to warm up the engine 91, 191 at a time of starting.

Obviously, various minor changes and modifications of the present invention are possible in the light of the above teaching. It is therefore to be understood that within the scope of the appended claims the invention may be practiced otherwise than as specifically described.

What is claimed is:

1. A heat storing device for exchanging heat energy between a heat storing material and a fluid, comprising a heat storing module having heat storing material spaces filled with the heat storing material and fluid passages for the fluid to flow through adjacent to the heat storing material spaces, wherein:

the heat storing module includes multiple flat plates in a stack;

each of the plates has the fluid passages in a first face thereof and the heat storing material spaces in a second face thereof, the first face and the second face being on opposite sides of the plate;

mutually adjacent pairs of the plates are stacked together so that the first faces thereof having the fluid passages face each other;

the fluid passages of a first plate of the pair, and the fluid passages of a second plate of the pair, intersect substantially at right angles; and the fluid passages mutually intersecting at right angles communicate with each other at positions where they intersect.

2. The heat storing device according to claim 1, wherein each of the plates comprises a quadrilateral plate having a multiplicity of the fluid passages formed by substantially straight channels extending between two mutually opposite sides of the four sides of the quadrilateral.

3. The heat storing device according to claim 2, further comprising one fluid inlet header fronting onto two adjacent sides of the stack of quadrilateral plates and one fluid outlet header fronting onto the other two sides of the stack of quadrilateral plates, wherein:
the fluid inlet header communicates with one end of the multiple fluid passages; and
the fluid outlet header communicates with opposite ends of the fluid passages.

4. The heat storing device according to claim 3, further comprising a blocking plate, provided between the fluid inlet header and the multiple plates and between the fluid outlet header and the multiple plates, for blocking off the ends of the heat storing material spaces from the ends of the fluid passages.

5. The heat storing device according to claim 1, wherein the positions where the multiple fluid passages intersect are arrayed with a fixed pitch.

6. The heat storing device according to claim 2, wherein the second plate is designed to assume a same shape as the first plate, when the second plate is turned upside-down with respect to the first plate and changed in phase through 90° with respect to the first plate.

7. The heat storing device according to claim 1, wherein the fluid passages comprise spiral-shaped recesses, and in each of the pairs of plates a spiral direction of the fluid passages in the second plate is opposite to a spiral direction of the fluid passages in the first plate.

8. The heat storing device according to claim 7, wherein the second plate is designed to assume a same shape as the first plate when turned upside-down with respect to the first plate.

9. The heat storing device according to claim 7, wherein when the plates are seen face-on, the mutually oppositely spiraling fluid passages intersect substantially at right angles.

10. The heat storing device according to claim 1, wherein the fluid passages are divided from the storing material spaces by generally vertical walls so that the fluid passages and the storing material spaces are not continuous with each other.

11. The heat storing device according to claim 10, wherein the fluid passages and the storing material spaces are of a generally same height.

* * * * *